United States Patent
Nishimura et al.

(10) Patent No.: US 11,755,833 B2
(45) Date of Patent: Sep. 12, 2023

(54) INFORMATION SEARCH SYSTEM AND INFORMATION SEARCH METHOD USING INDEX

(71) Applicant: Xcoo, Inc., Tokyo (JP)

(72) Inventors: Kunihiro Nishimura, Tokyo (JP); Takashi Aoki, Tokyo (JP); Toshiki Takeuchi, Tokyo (JP); Koichi Akabe, Tokyo (JP)

(73) Assignee: Xcoo, Inc., Tokyo (JP)

( * ) Notice: Subject to any disclaimer, the term of this patent is extended or adjusted under 35 U.S.C. 154(b) by 287 days.

(21) Appl. No.: 16/970,916

(22) PCT Filed: Mar. 4, 2019

(86) PCT No.: PCT/JP2019/008254
§ 371 (c)(1),
(2) Date: Aug. 18, 2020

(87) PCT Pub. No.: WO2019/172153
PCT Pub. Date: Sep. 12, 2019

(65) Prior Publication Data
US 2020/0394223 A1    Dec. 17, 2020

(30) Foreign Application Priority Data

Mar. 5, 2018  (JP) ................................ 2018-039167
Jul. 13, 2018  (JP) ................................ 2018-133752

(51) Int. Cl.
*G06F 16/903*    (2019.01)
*G06F 16/9032*   (2019.01)
(Continued)

(52) U.S. Cl.
CPC ........ *G06F 40/237* (2020.01); *G06F 16/9024* (2019.01); *G06F 16/90332* (2019.01);
(Continued)

(58) Field of Classification Search
None
See application file for complete search history.

(56) References Cited

U.S. PATENT DOCUMENTS 7,805,392 B1 *  9/2010  Steele ................... G06F 21/564
                                                    706/48
8,014,997 B2 *  9/2011  Huang ................ G06F 16/3338
                                                    704/7
(Continued)

FOREIGN PATENT DOCUMENTS

JP    2004-295301 A    10/2004
JP    2011-180823 A     9/2011
(Continued)

OTHER PUBLICATIONS

Fonseca, Bruno M., et al. "Concept-based interactive query expansion." Proceedings of the 14th ACM international conference on Information and knowledge management. 2005. 8 pages. (Year: 2005).*

(Continued)

*Primary Examiner* — Uyen T Le
(74) *Attorney, Agent, or Firm* — Studebaker & Brackett PC

(57) ABSTRACT

The present invention is an apparatus for creating an index for conducting a search on a database based on a resource including a text sentence. The apparatus comprises: a dictionary that includes a plurality of phrases associated with each other for each specific concept; an input interface unit that receives an input of the resource; a text processing unit that performs processing for extracting a plurality of words, as tokens, from the text sentence in the received resource; a directed graph generation unit that generates a directed graph representing a connection relationship between the extracted plurality of tokens in accordance with the text sentence; a directed graph search unit that conducts a search (Continued)

on the directed graph based on a search-target-phrase and that, if the search-target-phrase is found in the dictionary, locates a location in the directed graph where the search-target-phrase appeared; and an index creation unit that creates an index indicating association with the resource based on the plurality of tokens in the directed graph.

19 Claims, 22 Drawing Sheets

(51) Int. Cl.
    *G06F 40/284*     (2020.01)
    *G06F 40/205*     (2020.01)
    *G06F 40/242*     (2020.01)
    *G06F 40/237*     (2020.01)
    *G06F 16/901*     (2019.01)

(52) U.S. Cl.
    CPC ...... *G06F 16/90335* (2019.01); *G06F 40/205* (2020.01); *G06F 40/242* (2020.01); *G06F 40/284* (2020.01)

(56) References Cited

U.S. PATENT DOCUMENTS

| | | | | |
|---|---|---|---|---|
| 9,594,872 | B2* | 3/2017 | Masarie, Jr. | G16H 70/20 |
| 2003/0126106 | A1* | 7/2003 | Coen | G06F 16/34 |
| | | | | 707/E17.093 |
| 2004/0107088 | A1* | 6/2004 | Budzinski | G06F 16/3334 |
| | | | | 707/E17.084 |
| 2004/0186705 | A1* | 9/2004 | Morgan | G06F 40/169 |
| | | | | 704/9 |
| 2004/0220905 | A1* | 11/2004 | Chen | G06F 16/951 |
| 2005/0283473 | A1* | 12/2005 | Rousso | G06F 16/3322 |
| | | | | 707/999.005 |
| 2007/0106499 | A1 | 5/2007 | Dahlgren et al. | |
| 2007/0162481 | A1* | 7/2007 | Millett | G06F 16/31 |
| 2012/0072406 | A1 | 3/2012 | Iwakura et al. | |
| 2014/0278362 | A1 | 9/2014 | Gerken, III et al. | |
| 2015/0081656 | A1* | 3/2015 | Wang | G06F 16/90324 |
| | | | | 707/706 |
| 2015/0081715 | A1 | 3/2015 | Okura et al. | |
| 2015/0347626 | A1* | 12/2015 | Feller | G06F 16/367 |
| | | | | 707/794 |
| 2016/0203130 | A1 | 7/2016 | Roque et al. | |
| 2020/0349226 | A1* | 11/2020 | Ristoski | G06F 40/30 |

FOREIGN PATENT DOCUMENTS

| | | |
|---|---|---|
| JP | 2015-060243 A | 3/2015 |
| JP | 2015-133151 A | 7/2015 |
| RU | 2618375 C2 | 5/2017 |
| WO | 2010/106642 A1 | 9/2010 |

OTHER PUBLICATIONS

The extended European search report issued by the European Patent Office dated Nov. 5, 2021, which corresponds to European Patent Application No. 19763530.3-1231 and is related to U.S. Appl. No. 16/970,916.

International Search Report issued in PCT/JP2019/008254; dated Apr. 9, 2019.

An Office Action mailed by the Korean Intellectual Property Office dated Feb. 17, 2022, which corresponds to Korean Patent Application No. 10-2020-7028264 and is related to U.S. Appl. No. 16/970,916; with English language translation.

* cited by examiner

Figure 2A

| RESOURCE ID | RESOURCE NAME | URL | DIRECTED GRAPH ID |
|---|---|---|---|
| : | : | : | : |
| xx1 | XX THERAPEUTIC DRUG | https://www.example.com/... | 123..789 |
| xx2 | : | : | : |
| : | : | : | : |

Figure 2B

Index 241

| HEAD WORD | RESOURCE ID |
|---|---|
| : | : |
| poly | {xx1, xx2} |
| adp | {xx1, xx2} |
| ribose | {xx1, xx2, ..., yy1} |
| polymerase | {xx1} |
| inhibitor | {xx2, ...} |
| : | : |
| and poly | {xx1} |
| and ポリ | {xx1, xx2} |
| and parp | {xx1, xx2} |
| : | : |
| diphosphate ribose | {xx1, xx2, ..., yy1} |
| : | : |
| and poly adp | {xx1, xx2} |
| and ポリ adp | {xx1, xx2} |
| : | : |

(*) ポリ : PORI

Figure 3

DICTIONARY 22

| | | |
|---|---|---|
| parp | poly \| adp \| ribose \| polymerase | ポリ \| adp \| リボース \| ポリメラーゼ |
| adp \| リボース | adenosine \| diphosphate \| rivose | |
| parp \| inhibitor | parp \| 阻害 \| 剤 | |
| ... | ... | ... |
| breast \| cancer | 乳がん | 乳癌 |
| breast | mammary \| gland | |
| cancer | malignancy | 悪性 \| 腫瘍 |
| 腫瘍 | neoplasm | tumor |
| ... | ... | ... |

(\*) ポリ：PORI
 リボース：RIBOSU
 ポリメラーゼ：PORIMERAZE
 阻害：SOGAI
 剤：ZAI
 乳がん：NYUUGAN
 乳癌：NYUUGAN
 悪性：AKUSEI
 腫瘍：SHUYOU

*Figure 14*

DICTIONARY 22

| : | : | |
|---|---|---|
| total \| pareteral \| nutrition | tpn | |
| 栄養 \| 療法 | medical \| nutrition \| therapy | |
| nutrition | 栄養 | |
| : | : | |

(*) 栄養 : EIYOU
療法 : RYOUHOU

INFORMATION SEARCH SYSTEM AND INFORMATION SEARCH METHOD USING INDEX

FIELD

The present invention relates to information search techniques, in particular, to an apparatus and a method for creating an index for conducting a search on a database based on collected information, and to a program for executing such method.

BACKGROUND

Currently, various information search services using computer systems are provided. For example, a so-called "Internet search" is an information search service provided on a website for conducting a search on a vast amount of information (resources) dispersed on the Internet. Typically, a server program referred to as a search engine at a service provider performs an index search based on a search query provided by a user, and then provides the user with a search result. In such information search service, the search engine typically causes, in advance, a robot agent referred to as a crawler to regularly visit web pages on the Internet, and to collect and analyze information on the visited web pages in order to create an index for conducting a search on a database. When the user accesses a search site via a web browser and enters text that the user wants to search (a search query), the search engine analyzes the search query to conduct a search on the index and scores the extracted results based on a predetermined ranking algorithm in order to provide the user with the search result obtained by sorting the extracted results in score order.

Such a conventional index-type search engine creates an index directly from the information collected in advance by the crawler, and the user therefore obtains the search result based only on the indexed information. Accordingly, for example, Patent Document 1 listed below, proposes a technique in which one or more federated searches are indexed in accordance with index criteria, a query is compared to one or more of the index criteria, the query is matched with the index criteria, and results from one or more indexed federated searches associated with index criteria associated with the query are provided.

Patent Document 2 listed below, discloses a machine translation apparatus that: divides an original text into phrases; obtains a paraphrase that forms a pair with one or more of the phrases based on paraphrase information; and obtains a paraphrase lattice that includes a phrase set using one or more phrases and one or more paraphrases, in order to obtain a high-precision translation.

PRIOR ART REFERENCES

Patent Documents

Patent Document 1: Japanese Patent Publication No. 2015-133151
Patent Document 2: Japanese Patent Publication No. 2011-180823

SUMMARY

Problems to be Solved by the Invention

The above-described information search services are widely spread throughout all sorts of human social activities and, as one example, the medical field is no exception.

For example, in order for a new medical treatment or drug candidate to be approved as a standard treatment, clinical testing needs to be carried out to confirm the efficacy, safety and any other aspect of such treatment and drug. Typically, medical practitioners, such as physicians, formulate clinical testing plans based on their expertise, taking into consideration the content and significance of the treatment and all possible matters, including side effects. For this purpose, medical practitioners need to collect all types of information (e.g., names of diseases and drugs) related to subjects' diseases when formulating the clinical testing plans. For example, medical practitioners may extract information on other clinical testing, academic papers and any other information from database systems using the related information, and determine procedures based on such information.

As a practical matter, however, one specific word or expression (phrase) is not specified uniquely to one specific concept and a plurality of phrases typically exist for one specific concept. Especially in a specialized field like the medical field, a plurality of phrases, more specifically their synonyms, equivalent terms, related words, abbreviations and foreign words, and even derivative words and the like derived from the foregoing words (each of these will be referred to as the "related phrase" and also collectively referred to as the "related-phrase family" hereinafter), are commonly present for one specific concept.

If a medical practitioner conducts a search on a database system based on related information that is biased (while the medical practitioner him/herself usually does not recognize that such information is biased), there is a possibility that appropriate information may not be obtained and this may affect the formulation of the clinical testing plans.

As described above, the existing index-type search engine creates an index solely based on headwords directly obtained from the collected information. Therefore, only the search result solely based on such headwords may be obtained. Alternatively, if a specific word given as the search query is not present in the index as a headword, an alternative word is selected that is considered to be close to the specific word (e.g., a correctly-spelled word for an incorrectly-spelled word) and the search is merely conducted based only on such alternative word. Therefore, the scope of the words provided based on the search query is limited.

The information search technique disclosed in Patent Document 1 conducts a federated search on an index associated with the index criteria based on a given search word and provides the results thereof; however, words associated only with the given search query are merely indexed and thus the scope of the words provided based on the search query is again limited.

Moreover, the machine translation apparatus disclosed in Patent Document 2 obtains the set of phrases by paraphrasing the phrase in the original text; however, such set of phrases merely utilizes a paraphrase that directly corresponds to the phrase in the original text. Patent Document 2 is directed toward a machine translation technique and thus, such technique cannot be directly applied to the index creating technique such as that used in search engines.

In view of the above, a technique is desired that enables a search to be conducted in an extensive and efficient manner on a related-phrase family based on a specific phrase in a specialized field, such as the medical field; however, the above-described conventional information search technique is far from sufficient.

In addition, if a user can recognize the grounds for the extracted search result when such search result is provided, such grounds may be conveniently used for a following search. In particular, if the search result is not obtained directly in response to the phrase in the search query but is instead obtained in response to a phrase related to the phrase in the search query, the user needs to know based on which related phrase the user obtained the search result.

An object of the present invention is to provide a technique for creating an index, in an index-type search engine, that allows a search to be conducted efficiently on collected information.

More specifically, an object of the present invention is to provide a technique for creating an index, in which not only a specific phrase contained in a collected resource but also extended phrases, such as its synonyms, equivalent terms, related words, abbreviations and foreign words, and even derivative words derived from the foregoing words, are used as headwords.

In addition, an object of the present invention is to provide a technique that allows a search to be conducted efficiently on collected information that served as a basis for the index creation, and also allows an extraction to be made, even if a search query from a user includes a phrase other than phrases contained in such collected information.

Moreover, an object of the present invention is to provide a technique that enables such user to recognize the grounds for the extracted result.

Means for Solving the Problems

The present invention is configured to include the following matters specifying the invention or technical features in order to achieve the above-described objects.

The invention according to an aspect is an apparatus for creating an index for conducting a search on a database based on a resource including a text sentence. The apparatus may comprise, for example: a dictionary that includes a plurality of phrases associated with each other for each specific concept; an input interface unit that receives an input of the resource; a text processing unit that performs processing for extracting a plurality of words, as tokens, from the text sentence in the received resource; a directed graph generation unit that generates a directed graph (a lattice) representing a connection relationship between the extracted plurality of tokens in accordance with the text sentence; a directed graph search unit that conducts a search on the directed graph based on a search-target-phrase and that, if the search-target-phrase is found in the dictionary, locates a location in the directed graph where the search-target-phrase appeared; and an index creation unit that creates an index indicating association with the resource based on the plurality of tokens in the directed graph. The directed graph search unit may be configured to set at least one token in the directed graph to be the search-target-phrase and refer to the dictionary based on the set search-target-phrase. The directed graph generation unit may be configured to add to the directed graph, based on the dictionary, a new token that is based on at least one phrase associated with the search-target-phrase in order to update the directed graph.

Based on the above-described configuration, the apparatus is enabled to create an index including, as headwords for the resource, not only a phrase contained in the text sentence in the resource but also the related-phrase family including a paraphrase of such phrase. The apparatus proceeds with the search while updating the directed graph generated based on the text sentence, and thus the apparatus can include, in the related-phrase family, not only the paraphrase directly related to the phrase in the text sentence but also an indirect or derivative paraphrase related to the phrase contained in the directed graph at the time of update.

The text processing unit may be configured to perform a predetermined syntax analysis on the text sentence in order to extract the plurality of words as the tokens. This allows a directed graph to be generated that is based on the text sentence.

The directed graph generation unit may be configured to generate the directed graph in which neighboring tokens, in the plurality of tokens, are connected to each other by a node. The directed graph defines the token as a label of an edge and may have a data structure represented by connecting the edges by the nodes.

The directed graph generation unit may be configured to connect the at least one phrase associated with the search-target-phrase found in the dictionary between a node in front of and a node behind the appearance location in the directed graph.

The directed graph search unit may be configured to conduct a search on a directed graph updated by the directed graph generation unit. Accordingly, as the directed graph to be searched changes dynamically, not only the phrase in the text sentence but also the new phrase that has been paraphrased is further paraphrased.

In addition, the directed graph search unit may conduct a search on the updated directed graph so as to avoid a re-search of a token that has already been searched in the updated directed graph.

The directed graph may include a plurality of nodes that connect neighboring tokens to each other in the plurality of tokens. The directed graph search unit may store a node that is associated with a token that has already been searched as a searched node and conduct a re-search on a token that is connected to a node other than the searched node.

Further, the apparatus may comprise a data arrangement that indicates a tree structure arranged based on the plurality of phrases included in the dictionary. The tree structure may be a trie or a prefix tree that includes an ordered node corresponding to each of the plurality of phrases. The directed graph search unit may conduct a search on the directed graph with reference to the tree structure.

Moreover, the directed graph search unit may determine that the search-target-phrase has appeared in the directed graph, if the search-target-phrase matches at least one phrase corresponding to at least one ordered node in the tree structure.

Further, the directed graph generation unit may add to the directed graph a new token that is based on at least one phrase in the dictionary in order to update the directed graph, the at least one phrase being associated with the matched search-target-phrase.

The index creation unit may be configured to extract an N-gram based on the plurality of tokens in the updated directed graph and create the index based on the extracted N-gram. Accordingly, an index is created that includes phrases other than the phrase in the text sentence in the resource as N-grams.

In addition, the index creation unit may be configured to extract a word-based N-gram (a word-N-gram) as the N-gram. Such word-N-gram is based on the tokens in the directed graph and thus an index is created that is suitable for a search based on the related-phrase family.

The invention according to another aspect is a search apparatus or a search engine that comprises: an index created by the above-described apparatus; a resource information file that is related to the resource associated with the index; and a query server that conducts a search on the index based on a search query, identifies a predetermined resource from the resource information file based on the result of the search, and outputs a search result indicating the identified predetermined resource. The query server identifies, based on a directed graph being obtained from the identified predetermined resource and including a predetermined related phrase that is related to a phrase in the predetermined resource, a ground phrase that served as grounds for the predetermined resource to be identified and an original phrase, in the predetermined resource, that is associated with the ground phrase. The search result includes the ground phrase and the original phrase. This configuration enables a user to recognize, in addition to the searched resource, a ground phrase that served as grounds for such resource to be searched and an original phrase related to such ground phrase, as a search result in response to the search query.

The invention according to a further aspect is a method for operating an apparatus for creating an index for conducting a search on a database based on a resource including a text sentence. The method may comprise, for example: loading a dictionary including a plurality of phrases associated with each other for each specific concept into a memory accessed by a processor of the apparatus; receiving an input of the resource via an input interface unit; performing text-processing for extracting a plurality of words, as tokens, from the text sentence in the received resource; generating a directed graph representing a connection relationship between the extracted plurality of tokens in accordance with the text sentence; searching the directed graph based on a search-target-phrase; and creating an index indicating the association with the resource based on the plurality of tokens in the directed graph in order to register the index in the database. The searching the directed graph may include setting at least one token in the directed graph to be the search-target-phrase; referring to the dictionary based on the set search-target-phrase; and if the search-target-phrase is found in the dictionary, locating a location in the directed graph where the search-target-phrase appeared. The generating the directed graph may include adding to the directed graph, based on the dictionary, a new token that is based on at least one phrase associated with the search-target-phrase in order to update the directed graph.

The invention according to a further aspect is a method for operating a search apparatus for conducting a search on an index based on a search query and for identifying at least one resource from a resource information file based a result of the search. The operation method may comprise: based on a directed graph being obtained from the identified at least one resource and including a predetermined related phrase that is related to a phrase in the at least one resource, identifying a ground phrase that served as grounds for the at least one resource to be identified and an original phrase, in the at least one resource, that is associated with the ground phrase; and outputting information, as a search result, indicating the predetermined resource, the ground phrase and the original phrase.

The invention according to a further aspect may be a computer program or a computer-readable recording medium having recorded thereon, in a non-transitory manner, such computer program for causing a computing device to implement the above-described respective methods.

It should be noted that, in the present specification, etc., a means not only simply refers to a physical means but also includes the case where the function of such means is realized by software. Moreover, a function of one means may be implemented by two or more physical means, or functions of two or more means may be implemented by one physical means.

Effect of the Invention

According to the present invention, an index is created, in an index-type search engine, that enables a search to be conducted in an efficient manner on collected information. Such index enables the search to be conducted on the collected information that served as a basis for creation of the index even with a phrase other than a phrase contained in the collected information.

According to the present invention, a user is enabled to recognize the grounds for the search result. In particular, the user is enabled to recognize a related phrase that served as the grounds for a resource obtained in response to a search query, even when such resource is not directly obtained in response to a phrase in the search query but is instead obtained in response to the related phrase that is related to the phrase in the search query.

Other technical features, objects and effects or advantages of the present invention will become apparent from the following embodiments described with reference to the accompanying drawings.

BRIEF DESCRIPTION OF THE DRAWINGS

FIGS. 2A and 2B show an example of a database in a search engine according to an embodiment of the present invention.

FIG. 3 is a diagram for illustrating an example of a dictionary in a search engine according to an embodiment of the present invention.

FIG. 14 is a diagram for illustrating another example of a dictionary in a search engine according to an embodiment of the present invention.

DESCRIPTION OF THE EMBODIMENTS

Figure 1:
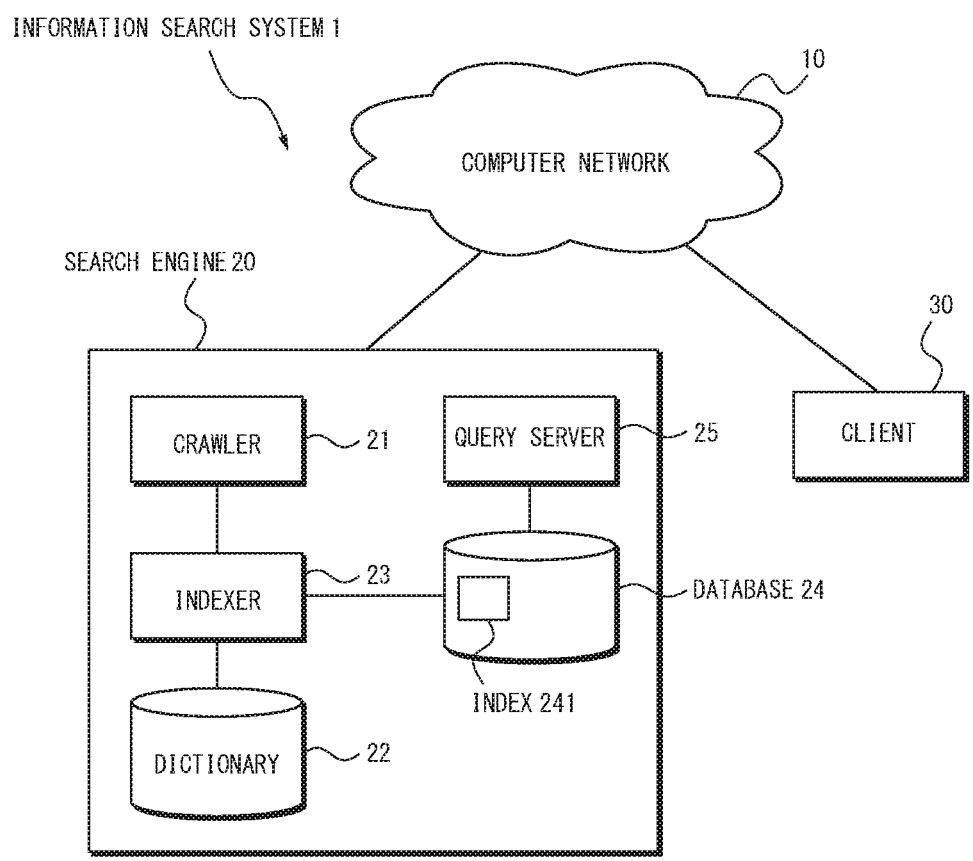
FIG. 1 is a block diagram showing a schematic configuration of an information search system according to an embodiment of the present invention.

Embodiments of the present invention will be described hereinafter with reference to the drawings. The embodiments described hereinafter, however, are merely illustrative and there is no intention to exclude various modifications and applications of techniques that are not explicitly described hereinafter. Various modifications (such as combinations of the respective embodiments) of the present invention may be implemented within the scope not departing from the spirit of the present invention. In the description of the drawings hereinafter, identical or similar parts are denoted by identical or similar reference numerals. The drawings are schematic and do not necessarily correspond to the actual dimensions, ratios or the like. Dimensional relations or ratios between parts may differ with respect to each other among the drawings.

FIG. 1 is a block diagram showing a schematic configuration of an information search system according to an embodiment of the present invention. As shown in FIG. 1, the information search system 1 of the present embodiment is configured to include at least one search engine 20 and at least one client 30, which are communicably connected to each other via a computer network 10.

The computer network 10 typically includes an IP-based computer network, but the configuration is not limited thereto. For example, a network of any protocol that allows communication between nodes may be applied for the computer network 10.

Figure 18:
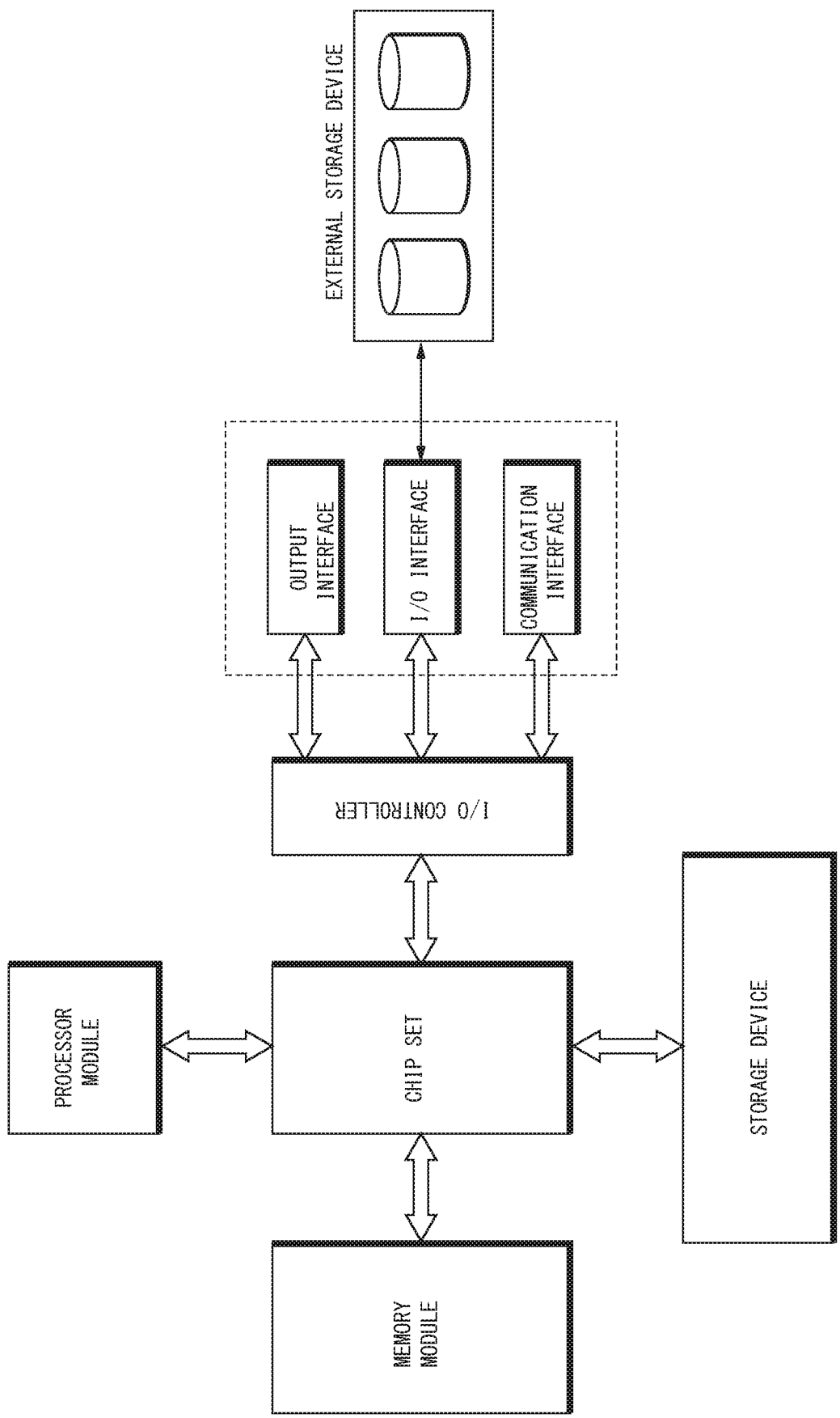
FIG. 18 is a block diagram showing an example of a hardware configuration of a search engine according to an embodiment of the present invention.

The search engine 20 is a computer system that provides the client 30 with an information search service and may be implemented by, for example, one or more general-purpose computing devices. Specifically, the search engine 20 is a virtual machine that is embodied, together with other hardware elements, by one or more CPUs (processors) on a computing device executing, for example, a search engine program of the present embodiment on a predetermined operating system (OS). The search engine 20 may be implemented with a virtual technique. The hardware configuration of a computing device that implements the search engine 20 is shown in FIG. 18; however, since such configuration is known, a detailed description thereof will be omitted here. The search engine 20 in the present embodiment is an index-type search engine and has, for example, a function of creating/updating an index and a function of database searching based on such index. As shown in FIG. 1, the search engine 20 is configured to include, for example, a crawler 21, a dictionary 22, an indexer 23, a database 24 and a query server 25. It should be noted that, from the point of view of a user who intends to conduct an information search, the search engine 20 is a virtual machine (a search engine in a narrow sense or a search apparatus) that implements the index-based database search function.

The crawler 21 is an automatic crawling agent program for automatically collecting a wide variety of resources on the web (e.g., webpages, documents, images, programs, etc.). In particular, the crawler 21 periodically visits websites while following links in webpages and collects resources in the websites. For example, the crawler 21 may collect resources in the websites pertaining to specific domains of expertise. The crawler 21 may temporarily store the collected resources in, for example, a storage device (not shown). In the information search system 1 of the present embodiment, a known crawler 21 may be applied and thus, a detailed description thereof will be omitted here.

The dictionary 22 includes one or more files or tables in which a plurality of phrases associated with each other regarding a specific concept are stored, but the configuration is not limited thereto. For example, the dictionary 22 may be configured as a static file or table, and may not be memory-resident and may be dynamically configured as a dictionary model (e.g., a neural network model) in which the relationship between the phrase families is built in accordance with a predetermined algorithm. The term "phrase" used in the present disclosure refers to a term or an expression made up of a single word or a sequence of two or more words. The plurality of phrases associated with each other is referred to as a related-phrase family. As an example, the related-phrase family may include synonyms, equivalent terms, related words, abbreviations and corresponding foreign words, and even derivative words and the like derived from the foregoing words. The dictionary 22 may be constructed based on available information sources in a manual, semi-automatic or full-automatic manner. In the case of the medical field, various dictionaries provided by the National Cancer Institute (NCI) are used for constructing the dictionary 22. The dictionary 22 is referred to when the below-described indexer 23 creates an index 241.

The indexer 23 registers the resources (e.g., information related to the resources) collected by the crawler 21 in the database 24, analyzes the content (typically, text sentences) of such resources, and creates and updates the index 241 in accordance with the analysis result. In general, the indexer 23 of the present embodiment: divides the text sentence contained in the resources down into several tokens; creates a directed graph (a lattice) based on the tokens; conducts a search on the directed graph in accordance with a predetermined phrase with reference to the dictionary 22; and expands and updates the directed graph under a predetermined condition. The updated directed graph becomes a new directed graph to be searched. The indexer 23 then extracts headwords using a predetermined approach (e.g., the N-gram approach) based on the expanded directed graph and associates the headwords with the collected resources (i.e., indexes the collected resources with the headwords) to create and/or update the index 241. Further, the indexer 23 associates the created directed graph with the collected resources and registers them in the database 24.

The database 24 stores therein information related to the resources collected by the crawler 21 and is configured to include the index 241 of such information. Further, the database 24 stores therein the directed graph used to create the index 241. FIGS. 2A and 2B show an example of a database in a search engine according to an embodiment of the present invention. FIG. 2A shows an example of information related to the resources. The information related to the resources is a structure file that contains, for example, a resource ID for identifying a resource, a resource name, a URL, a directed graph ID for identifying a directed graph, and the like. The structure file having the information related to the resources stored therein is herein referred to as the resource information file. The index 241 is a structure file that is created by the indexer 23 and contains index information to be updated. FIG. 2B shows an example of the index 241. The index 241 typically has a data structure referred to as an inverted index. The index information is, for example, a headword extracted from a word sequence in a directed graph by the N-gram approach. The headword in the index 241 is associated with a resource (more specifically, a resource ID) so that the headword is associated with an individual dataset of the resource information file of the database 24. It should be noted that the index 241 is configured herein as part of the database 24, but the configuration is not limited thereto and thus both the index 241 and the database 24 may be configured as separate entities.

Reverting to FIG. 1, the query server 25 receives a search query provided from the client 30, conducts a search on the index 241, extracts information related to a relevant resource from the database 24 based on a result of the search, and provides the client 30 with such information as the search result. For example, the query server 25 may calculate a degree of matching between the search query and the extracted resources by way of a predetermined method and provide the search result in which the extracted resources are ranked in accordance with the calculated result. The query server 25 in the present embodiment directly returns to the client 30 the search result in response to the search query from the client 30, but the configuration is not limited thereto. For example, the query server 25 may pass the search result to another application program via a predetermined application program interface (API), and then a result of predetermined information processing on the search result by such other application program may be returned to the client 30. A known query server 25 may be applied in the information search system 1 of the present embodiment.

The client 30 is typically a computing device possessed by a user and may be, for example, a personal computer. The client 30 includes, for example, a viewer that functions as a user interface for accessing the search engine 20 via the computer network 10. The viewer may be a web browser, but the configuration is not limited thereto. The client 30 may establish a communication session with the search engine 20 via the computer network 10 by utilizing a secure communication technique, such as SSL. The client 30 is configured to include one or more CPUs (processors), a memory and any other component; however, since the hardware configuration of the client is known, a detailed description thereof will be omitted here.

FIG. 3 is a diagram for illustrating an example of a dictionary in a search engine according to an embodiment of the present invention. As shown in FIG. 3, the dictionary 22 is configured as a table in which a plurality of phrases, which are made up of one or more words, are stored. Each of the plurality of phrases is associated with each other for each specific concept. In FIG. 3, for example, each of the phrases "parp," "poly|adp|ribose|polymerase" and "PORI|adp|RI-BOSU|PORIMERAZE" are associated with each other and registered in the dictionary. (The original texts in Japanese herein are denoted as "PORI," "RIBOSU," and "PORIM-ERAZE." The same should apply hereinafter.) The symbol "|" (vertical line) represents a delimiter added for separating individual words in the phrase. As will be described hereinafter, the individual words configuring the phrase can be handled as individual tokens in a directed graph by separating the words configuring the phrase by a delimiter in this manner. It should be noted that the mutually-associated three phrases are herein shown as a single dataset, but the configuration is not limited thereto and thus the number of phrases is not limited.

Figure 4:
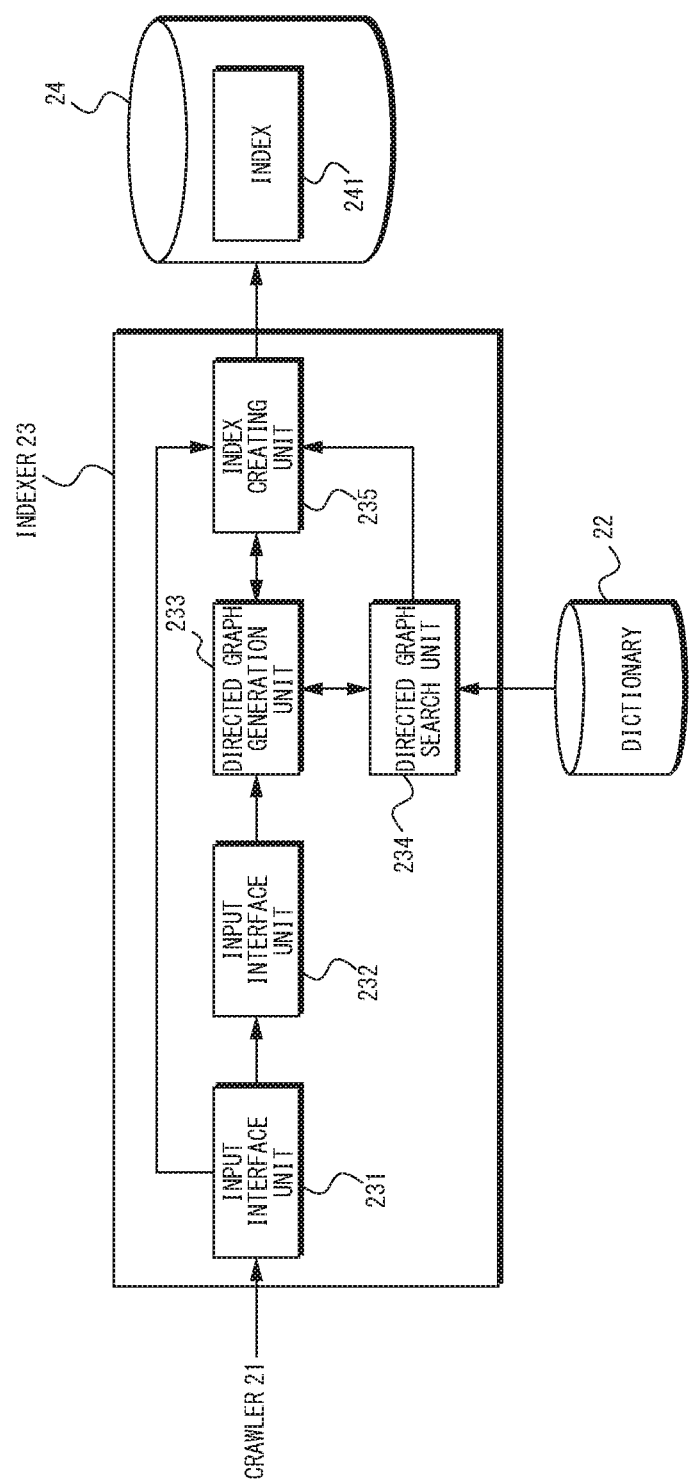
FIG. 4 is a block diagram showing a schematic configuration of an indexer of a search engine according to an embodiment of the present invention.

FIG. 4 is a block diagram showing a schematic configuration of an indexer of a search engine according to an embodiment of the present invention. As shown in FIG. 4, the indexer 23 of the present embodiment is configured to include, for example, an input interface unit 231, a text processing unit 232, a directed graph generation unit 233, a directed graph search unit 234 and an index creation unit 235.

Figure 5:
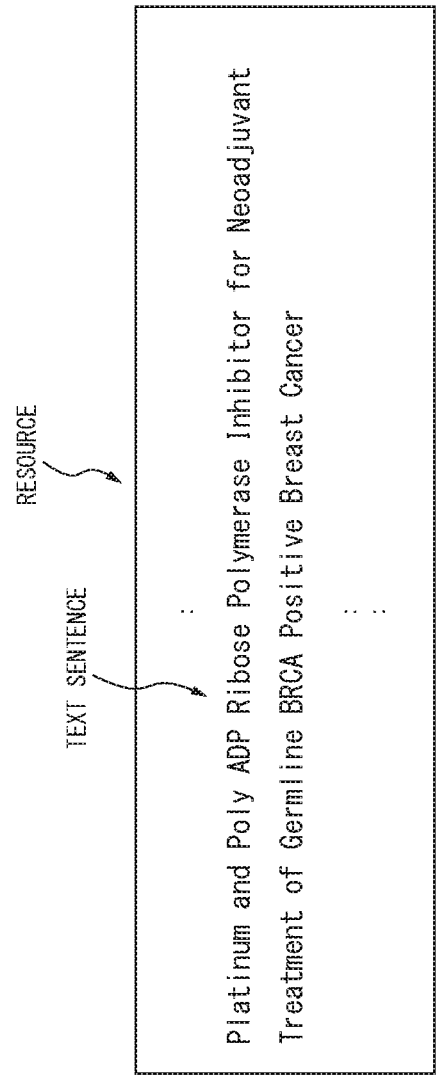
FIG. 5 shows an example of a text sentence to be entered into a text processing unit of a search engine according to an embodiment of the present invention.

The input interface unit 231 serves as an interface between, for example, the crawler 21 and the text processing unit 232. The input interface unit 231 communicates with the crawler 21 and inputs, into the text processing unit 232, a text sentence, such as that shown in FIG. 5, that is contained in the resources collected by the crawler 21.

The text processing unit 232 performs, for example, morphological analysis on the input text sentence to extract a plurality of tokens. The text processing unit 232 may typically include a language analysis engine (not shown) adapted to the respective languages such as Japanese and English. A known language analysis engine may be used for the language analysis engine.

The directed graph generation unit 233 generates a directed graph that is based on the plurality of tokens extracted by the text processing unit 232. More specifically, the directed graph generation unit 233 connects neighboring tokens by a node for each of the plurality of tokens extracted by the text processing unit 232 in order to generate a directed graph (see, for example, FIG. 7A that represents the connection relationship between the plurality of tokens. In other words, a directed graph is generally represented by edges and nodes, and in the directed graph of the present embodiment, it can be said that the individual tokens are defined as edge labels and that the directed graph is represented by such labelled edges and nodes. The directed graph thus directly generated from the text sentence by the directed graph generation unit 233 includes only a single path extending from a leading node to a final node. It should be noted that the directed graph illustrated in the present disclosure is drawn for ease of understanding and that, in effect, the directed graph is typically treated in a computing device as a type of data structure that can be interpreted by a processor. The directed graph generation unit 233 expands and updates the directed graph by dynamically changing the connection relationship in the directed graph in accordance with the search result from the below-described directed graph search unit 234.

The directed graph search unit 234 sets a phrase to be searched (hereinafter referred to as the "search-target-phrase") and conducts a search on the directed graph based on the search-target-phrase with reference to the dictionary 22. The search-target-phrase is any one or more tokens in the directed graph and may be selected and set sequentially from the leading token. More specifically, the directed graph search unit 234 of the present embodiment conducts a search on the directed graph along the edges and nodes in a sequential order based on the set search-target-phrase in order to determine whether or not the search-target-phrase is registered in the dictionary 22. If the directed graph search unit 234 determines that the search-target-phrase is registered in the dictionary 22, i.e., if the search-target-phrase is found in the dictionary 22, then the directed graph search unit 234 locates the location in the directed graph where the search-target-phrase appeared and notifies the directed graph generation unit 233 of the located location. In response to this, the directed graph generation unit 233 updates the directed graph by additionally connecting a phrase associated with the search-target-phrase in the dictionary 22 between a node in front of the located location and a node behind the located location in the directed graph. Therefore, in the updated directed graph to which a new phrase is added, a plurality of paths may be present between the leading node and the final node of the text sentence, as shown in, for example, FIG. 9(*b*).

The index creation unit 235 creates an index indicating the association with the collected resources based on the final directed graph that can be obtained when the directed graph search unit 234 terminates the search. More specifically, the index creation unit 235 traces the updated final directed graph and extracts therefrom a word (token)-based N-gram (hereinafter referred to as the "word-N-gram") (i.e., a sequence of words) in order to create the index 241 by associating the extracted word-N-gram with a resource. The extracted word-N-gram is treated as a headword. In the present embodiment, N is equal to or smaller than 3, i.e., N≤3 (where N is a positive number). Namely, a sequence of one to three words (i.e., a 1-gram, a 2-gram and a 3-gram) is used as a headword in the index 241. The word-based N-gram is used in the present embodiment but the configuration is not limited thereto and thus there is no intention to exclude the use of a character-based sequence (i.e., a sequence of one character, two characters, . . . ) as in the conventional N-gram method.

Figure 6:
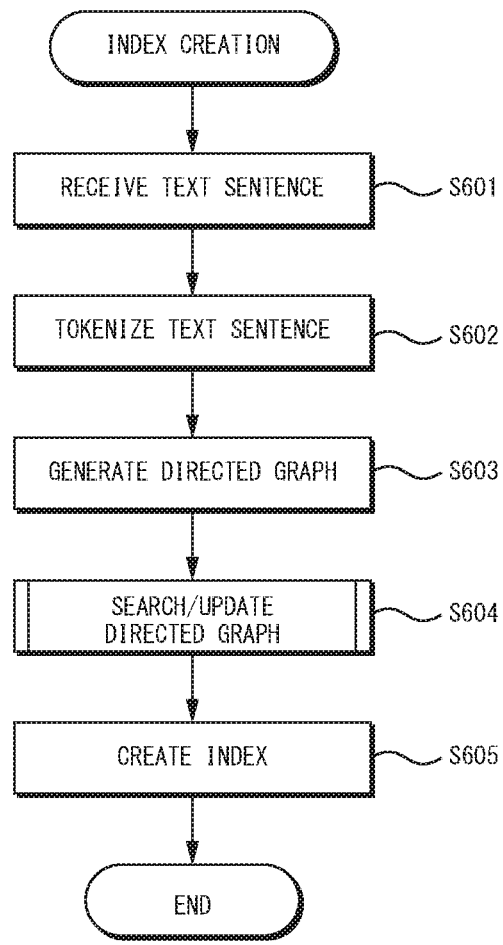
FIG. 6 is a flowchart for illustrating index creation processing by a search engine according to an embodiment of the present invention.

FIG. 6 is a flowchart for illustrating index creation processing by a search engine according to an embodiment of the present invention. Such processing may be implemented by a processor in a computing device executing a predetermined search engine program according to the present embodiment.

As shown in FIG. 6, the search engine 20 receives a text sentence contained in a resource collected by the crawler 21 (S601). For example, if the input interface unit 231 receives the resource collected by the crawler 21, the input interface unit 231 inputs the text sentence contained in the resource to the text processing unit 232. If the search engine 20 receives the text sentence, the search engine 20 performs morphological analysis on the text sentence and tokenizes the text sentence, i.e., extracts a plurality of tokens from the text sentence (S602). For example, the text processing unit 232 determines the language of the text sentence and extracts the plurality of tokens from the text sentence through the morphological analysis processing adapted to the determined language.

Figure 7A:
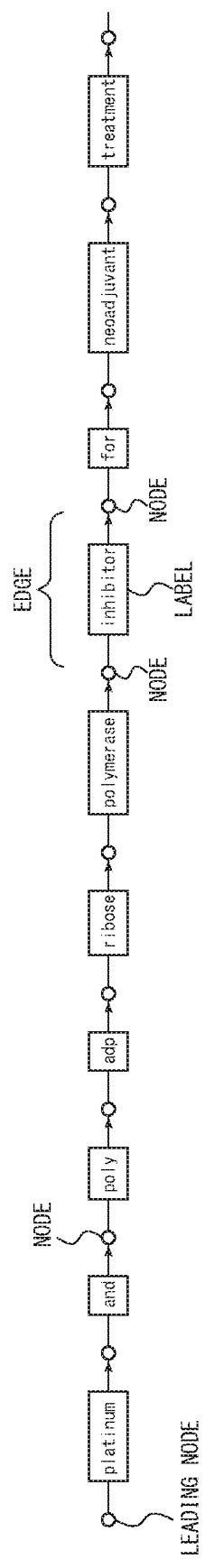
FIGS. 7A and 7B show examples of part of an initial directed graph generated by a search engine according to an embodiment of the present invention.
Figure 7B:
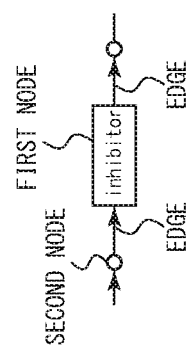

The search engine 20 then generates a directed graph based on the extracted plurality of tokens (S603). For example, the directed graph generation unit 233 connects neighboring edges by a node, with the tokens being used as edge labels, for each of the plurality of tokens extracted by the text processing unit 232 in order to generate a directed graph that represents the connection relationship between the plurality of tokens. Herein, the directed graph first generated from the text sentence will be referred to as the initial directed graph. FIGS. 7A and 7B shows part of the initial directed graph generated from the input text sentence shown in FIG. 5. Namely, as shown in FIG. 7A, in the directed graph of the present embodiment, the individual tokens are defined as edge labels, and the directed graph is represented by such labelled edges and the nodes. As shown in FIG. 7A, the initial directed graph has only one path leading from the leading node.

It should be noted that the present embodiment shows the directed graph in which the individual tokens are defined as the edge labels as described above; however, the configuration is not limited thereto. For example, as shown in FIG. 7B, a token may also be defined as a node (i.e., there are two types of nodes) and these two types of nodes may be connected by a simple edge in the directed graph. It should also be noted that such graph may be referred to as a lattice in the field of natural language processing, and the terms "graph" and "lattice" will be used interchangeably in the present disclosure.

Reverting to FIG. 6, the search engine 20 conducts a search on the directed graph with reference to the dictionary 22, and expands and updates the directed graph in accordance with the search result (S604). More specifically, the search engine 20 sequentially sets a predetermined term from the directed graph as a search-target-phrase, which is the target for search, and conducts a search on the directed graph along the edges and nodes based on such search-target-phrase. Every time the search-target-phrase is found in the dictionary 22, the search engine 20 expands and updates the directed graph based on a phrase associated with the found search-target-phrase. The details of the search/update processing of the directed graph will be described below with FIG. 8.

After the above-described search/update processing of the directed graph, the search engine 20 creates an index 241 that indicates the association with the collected resource based on the updated directed graph (S605). For example, the index creation unit 235 traces the updated final directed graph, extracts therefrom a sequence of words, including a 1-gram, a 2-gram and/or a 3-gram, and associates the extracted sequence of words with the collected resource as a headword in order to create the index 241, such as that shown in FIG. 2B. The index creation unit 235 also registers the resource information file, such as that shown in FIG. 2A, in the database 24 so as to correspond to the created index 241. This allows, for a future search query, a search to be conducted on resources based on headwords that fall within the extended scope of phrases related to the search query. In addition, the index creation unit 235 in the present embodiment associates the updated final directed graph with the collected resources when creating the index 241 and stores the directed graph associated with such resources in the database 24. In a case where a search is conducted based on a search query and such resources are obtained and extracted, the directed graph associated with such resources is used to present the grounds (e.g., the related phrases) for such resources obtained through the search.

Figure 8:
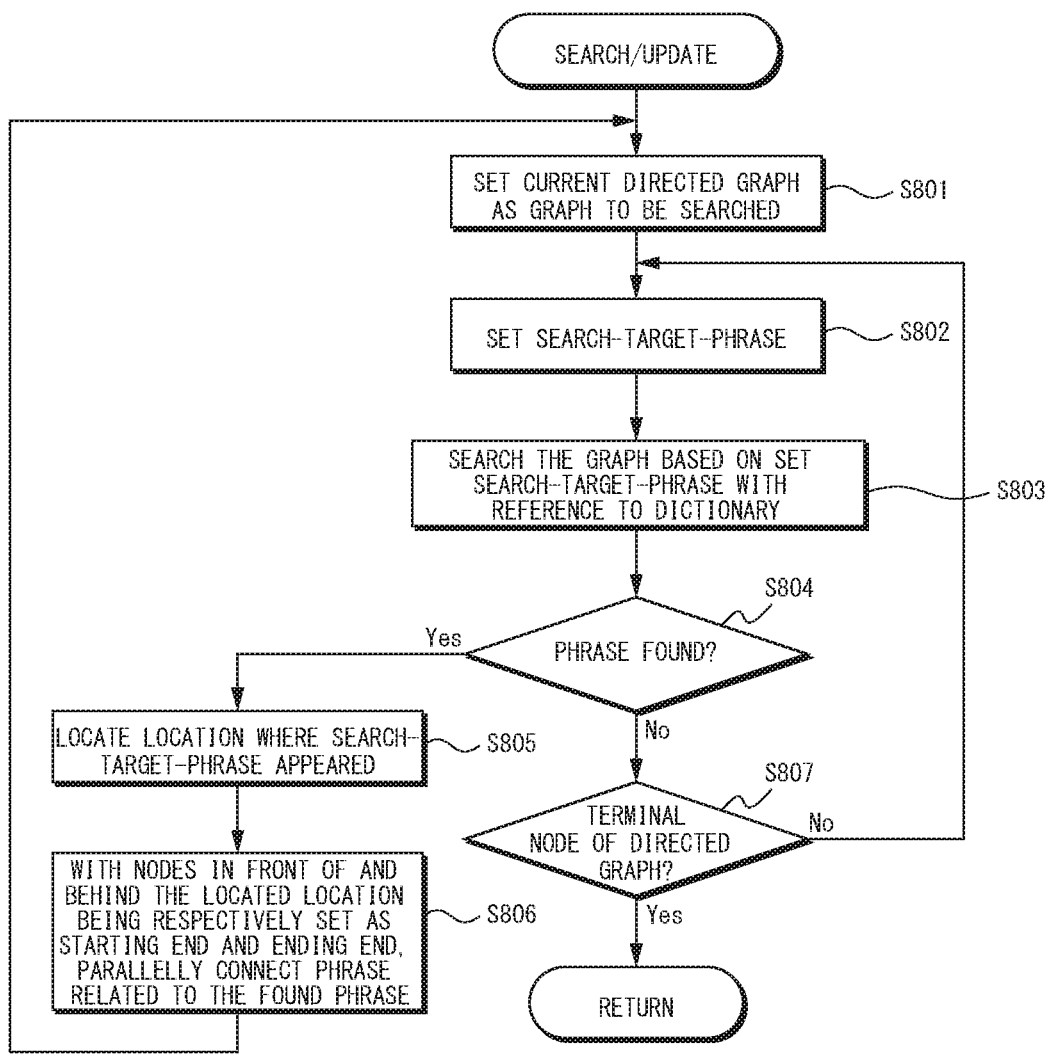
FIG. 8 is a flowchart for illustrating search/update processing of a directed graph by a search engine according to an embodiment of the present invention.

FIG. 8 is a flowchart for illustrating index creation processing by a search engine according to an embodiment of the present invention. More specifically, FIG. 8 is a flowchart illustrating the details of the search/update processing of the directed graph shown in FIG. 6.

Specifically, as shown in FIG. 8, for example, the directed graph search unit 234 first sets the current directed graph to a directed graph to be searched (S801). Then, the directed graph search unit 234 sets a predetermined token at the current search location in the directed graph as a search-target-phrase (S802). At the beginning of the search, the initial directed graph is the directed graph to be searched and the token connected to the leading node of the initial directed graph is set as the search-target-phrase. Predetermined tokens in the directed graph are sequentially set through the search of the directed graph. The search-target-phrase corresponds to one or more tokens.

The directed graph search unit 234 then conducts a search on the directed graph based on the set search-target-phrase with reference to the dictionary 22 (S803). For example, the directed graph search unit 234 conducts a search on the directed graph along the edges and nodes in a sequential order based on the set search-target-phrase in order to determine whether or not the search-target-phrase is registered in the dictionary 22 (S804). The search within the directed graph may be performed in accordance with, for example, the Knuth-Morris-Pratt (KMP) algorithm, but the configuration is not limited thereto.

If the directed graph search unit 234 determines that the search-target-phrase is registered in the dictionary 22 (S804, Yes), i.e., if the search-target-phrase is found in the dictionary 22, the directed graph search unit 234 locates the location in the directed graph where the search-target-phrase appeared and notifies the directed graph generation unit 233 of the located location (S805). In response to this, the directed graph generation unit 233 updates the directed graph by additionally connecting a phrase associated with the search-target-phrase in the dictionary 22 to between a node in front of and a node behind the located location in the directed graph (S806). Typically, such phrase is extracted as one or more tokens and connected to the directed graph. Thereafter, the directed graph search unit 234 returns to the processing in step S801 to continue the search. More specifically, the directed graph search unit 234 sets the current directed graph as the directed graph to be searched (S801), moves to the next search location and sets the token at such search location as a new search-target-phrase in order to proceed with the search processing (S802).

If, on the other hand, the search-target-phrase is not found in the dictionary 22 (S804, No), the directed graph search unit 234 determines whether or not a terminal node of the directed graph has been reached (S807). If the directed graph search unit 234 determines that the terminal node of the directed graph has not yet been reached (S807, No), the directed graph search unit 234 returns to the processing in step S802 in order to continue the search in the directed graph. If, on the other hand, the directed graph search unit 234 determines that the last node of the directed graph has been reached (S807, Yes), the directed graph search unit 234 terminates the search processing.

By way of the above-described processing, when creating an index for a search based on an entered text sentence, the search engine 20 is enabled to create the index based not only on a phrase in the original text sentence but also on individual phrases that fall under the extended related-phrase family by using the dictionary 22 in which a plurality of mutually-associated phrases are registered.

Figure 9:
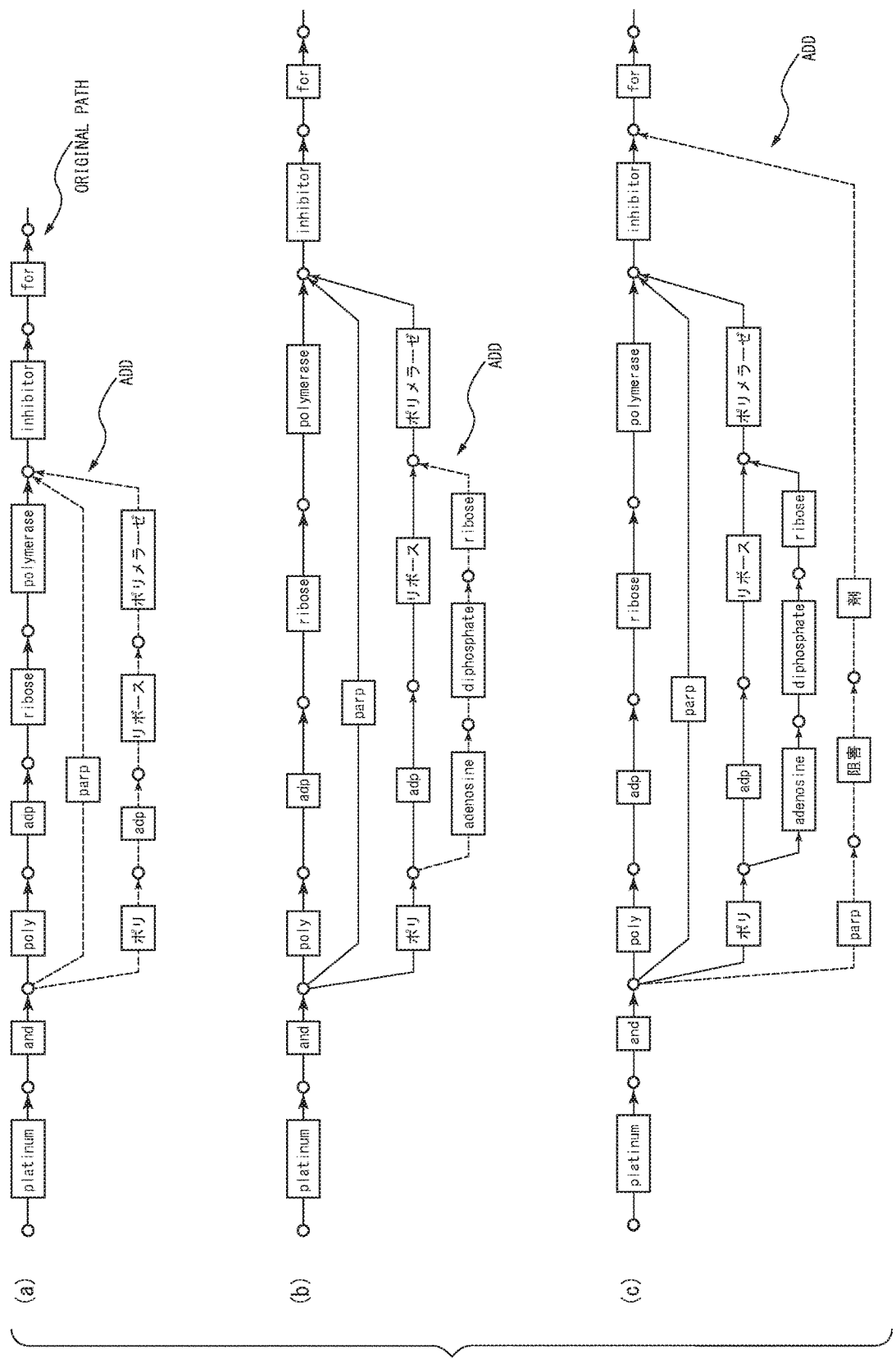
FIG. 9 is a diagram for illustrating an example of a process in which part of a directed graph is expanded by a search engine according to an embodiment of the present invention.

Next, an example of expansion processing of the directed graph by the search engine 20 will be described. FIG. 9 is a diagram for illustrating an example of a process in which a directed graph is expanded by a search engine according to an embodiment of the present invention. This example shows the expansion of the directed graph when the search engine 20 creates the index 241 for the resources including the text sentence shown in FIG. 5 based on the dictionary 22 shown in FIG. 4.

The search engine 20 first generates an initial directed graph, such as that shown in FIG. 7A, based on the entered text sentence as described above. The search engine 20 then starts conducting a search on the directed graph. If the set search-target-phrase "poly|adp|ribose|polymerase" is found in the dictionary 22 in such search process, the search engine 20 connects, in a parallel manner, each of the phrases "parp" and "PORI|adp|RIB OSU|PORIMERAZE" in the dictionary 22, which are phrases associated with the search-target-phrase "poly|adp|ribose|polymerase," between a beginning node and a terminal node, which are respectively in front of and behind the location of the search-target-phrase "poly|adp|ribose|polymerase" in the directed graph, in order to update the directed graph (FIG. 9(a)).

The search engine 20 then proceeds with conducting of a search on the directed graph. If the phrase "adp|RIBOSU" in the directed graph is set as the search-target-phrase, the search engine 20 finds this phrase "adp|RIBOSU" in the dictionary 22. The search-target-phrase "adp|RIBOSU" corresponds to a term has been added to the directed graph by the search engine 20 in the above-described search process. Analogously, the search engine 20 connects, in a parallel manner, the phrase "adenosine|diphosphate|ribose" in the dictionary 22, which is a phrase associated with the search-target-phrase "adp|RIBOSU," between a beginning node and a terminal node, which are respectively in front of and behind the location of the search-target-phrase "adp|RIBOSU" in the directed graph, in order to update the directed graph (FIG. 9(b)). In this manner, a further paraphrase may be additionally added to the path including the added phrases.

The search engine 20 then further proceeds with conducting of a search on the directed graph. If the phrase "parp|inhibitor" in the directed graph is set as the search-target-phrase, the search engine 20 finds this phrase "parp|inhibitor" in the dictionary 22. The search-target-phrase "parp|inhibitor" corresponds to a term that is obtained by combining the phrase "parp," which has been added to the directed graph by the search engine 20, with the neighboring word "inhibitor." Analogously, the search engine 20 connects, in a parallel manner, the phrase "parp|SOGAI|ZAI" in the dictionary 22, which is a phrase associated with the search-target-phrase "parp|inhibitor," between a beginning node and a terminal node, which are respectively in front of and behind the location of the search-target-phrase "parp|inhibitor" in the directed graph, in order to update the directed graph (FIG. 9(c)). In other words, the phrase "parp|SOGAI|ZAI" is connected, in a parallel manner, to the original path (i.e., poly→adp→ribose→polymerase→inhibitor) in the initial directed graph.

The search engine 20 expands and updates the directed graph by performing the search operation on the directed graph as described above. As a consequence, the updated directed graph has several parallel paths formed with respect to the original path in the initial directed graph. Accordingly, the extraction of headwords based on such directed graph enables an index to be created based not only on a phrase in the original text sentence but also on individual phrases (i.e., paraphrases) that fall under the extended related-phrase family.

Figure 10:
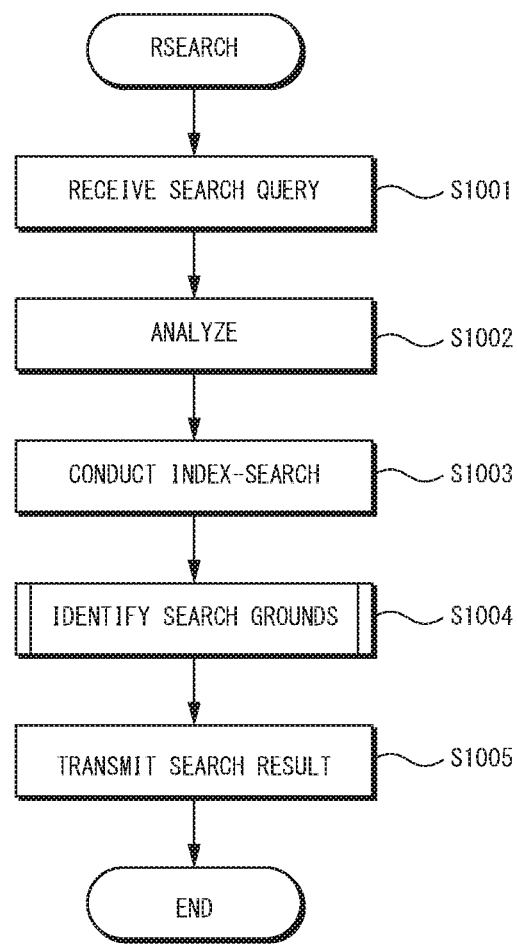
FIG. 10 is a diagram for illustrating an example of processing in which a directed graph is expanded by a search engine according to an embodiment of the present invention.

FIG. 10 is a flowchart for illustrating search processing by a search engine according to an embodiment of the present invention. Such processing is implemented by, for example, a processor in a computing device executing a predetermined search engine program.

As shown in FIG. 10, the search engine 20 receives a search query from the client 30 (S1001). For example, the client 30 transmits the search query to the search engine 20 when, for example, a user enters a search query to a search screen displayed on a web browser (not shown). The search engine performs predetermined analysis processing on the received search query (S1002). For example, the query server 25 creates an N-gram search formula for the search query received from the client 30. In the present embodiment, the maximum number for N is 3 (i.e., N=3), but the number is not limited thereto. Accordingly, if the search query includes four or more words, the query server 25 extracts 3-gram words and performs an AND search of these words. For example, if the search query is "platinum and parp inhibitor," then the search formula would be "(platinum and parp) AND (and part inhibitor)."

The search engine 20 then conducts a search on the index 241 based on the created search formula (S1003). For example, the query server 25 conducts a search on the index 241 based on the created search formula to check whether or not there is a matching headword in the index 241. If there is a matching headword, the query server 25 refers to the database 24 in accordance with the matching headword to extract information, including names and positional information of the resource associated with the headword, and returns the extracted result to the client 30. For example, the query server 25 conducts a search on the index 241 based on the search formula "(platinum and parp" AND (and parp inhibitor)," and thereby the resource containing the text sentence, such as that shown in FIG. 5, would match and be extracted. If there are a plurality of extracted results, the query server 25 may rank these results in accordance with their scores based on a predetermined score calculation. In the present embodiment, in a case of extracting resources associated with the headword, the query server 25 also identifies related phrases that served as the grounds for the matching resources and phrases in text sentences in the resources based on the directed graph associated with the resources (S1004). The details of the processing for identifying the search grounds will be described below, with reference to FIG. 11.

After the search engine 20 has identified the phrases that served as the search grounds, the search engine 20 transmits the search result including the phrases that served as the search grounds to the client (S1005). In response, the client 30 displays the search result on the search screen onto which the search query is entered.

A conventional search engine registers, in an index, a headword that is only based on a phrase contained in a text sentence in a collected resource and thus, in order for such resource to be extracted through a search, a search query needs to include the headword contained in such resource. For example, the conventional search engine would not create an index having a headword of the phrase "parp inhibitor" with respect to the text sentence shown in FIG. 5. Accordingly, if the search query from the client 30 is "platinum and parp inhibitor," a resource that does not include "parp inhibitor" would not be presented as a search result, or even if such resource is presented for other reasons, such resource would only be presented with a low rank. In contrast, the search engine 20 of the present embodiment is enabled to register, in the index 241, headwords based not only on a phrase contained in the text sentence but also on individual phrases that fall under the extended related-phrase family. Accordingly, even if the search query from the client 30 is "platinum and parp inhibitor," a resource that does not include "parp inhibitor" would still be presented as a search result.

Figure 11:
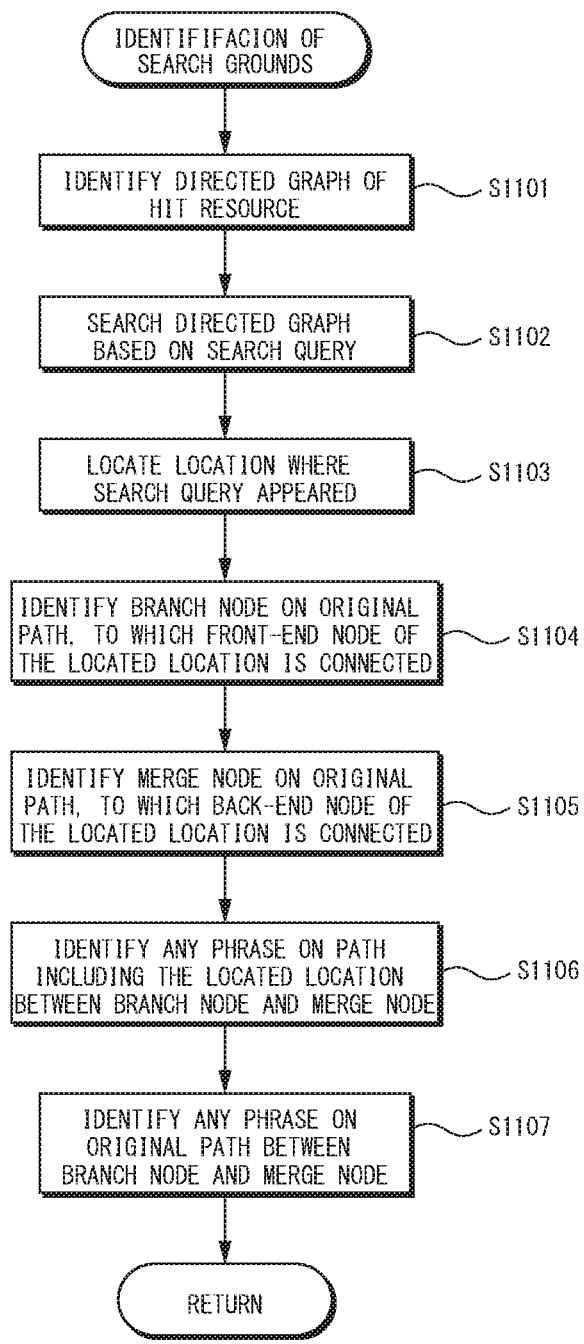
FIG. 11 is a flowchart for illustrating search processing by a search engine according to an embodiment of the present invention.

FIG. 11 is a flowchart for illustrating search processing by a search engine according to an embodiment of the present invention. More specifically, FIG. 11 is a flowchart for illustrating the details of the processing for identifying the search grounds shown in FIG. 10.

As shown in FIG. 11, the search engine 20 first identifies a directed graph of a resource that is obtained through a search (S1101). For example, the query server 25 refers to a resource information file of the database 24 as shown in FIG. 2, identifies a directed graph ID associated with a text sentence in the obtained resource, and reads a directed graph stored in the database 24 based on the identified directed graph ID. It should be noted that the search engine 20 in the present embodiment uses the directed graph IDs stored in association with the obtained resource but the configuration is not limited thereto and thus a directed graph may be re-generated for the obtained resource following the search/update processing shown in FIG. 8.

The search engine 20 then conducts a search on the identified directed graph based on the search query (S1102) in order to locate the location within the directed graph where the search query appeared (S1103). For example, the query server 25 traces each path in the directed graph along edges and nodes in a sequential order to locate the location where there is a match with the search query. The located location is either the entirety or part of one path and may therefore include a plurality of edges and nodes. The search may be performed according to the KMP algorithm. Alternatively, the search may be performed using tries T.

The search engine 20 then identifies a branch node on the original path in the directed graph, to which the path including the located location is connected (S1104), and then the search engine 20 identifies a merge node on the original path in the directed graph, to which the path including the located location is connected (S1105). The original path refers to a path in the directed graph that is obtained directly from the text sentence in the resource and is equivalent to a path in the above-described initial directed graph (see FIG. 7A). For example, the query server 25 traces the path including the located location backward (i.e., in the direction opposite to the edge orientation) from a front-end node of the located location until a node in the text-sentence-based original path is reached, and the query server 25 identifies the reached node as the branch node. Further, the query server 25 traces the path including the located location forward (i.e., in the direction of the edge orientation) from a back-end node of the located location until a node of the original path is reached, and the query server 25 identifies the reached node as the merge node. It should be noted that the query server 25 in the present example identifies the merge node after identifying the branch node; however, the query server 25 may identify the branch node after identifying the merge node or the branch node and the merge node may be identified in a simultaneous and parallel manner.

After identifying the branch node and the merge node, the search engine 20 identifies any phrase that is present on the path including the located location between the branch node and the merge node (S1106). For example, the query server 25 may extract edge labels during the backward path tracing in step S1104 and the forward path tracing in step S1105, store the extracted edge labels in a buffer, and identify a phrase based on the extracted edge labels stored in the buffer. The phrase identified in this step S1106 corresponds to a related phrase that served as the grounds for a hit obtained through the search.

Subsequently, the search engine 20 extracts any phrase that is present on the original path between the branch node and the merge node in an analogous manner (S1107). For example, the query server 25 may extract edge labels from the branch node to the merge node in the direction of the edge orientation, store the extracted labels in a buffer, and identify a phrase based on the extracted labels stored in the buffer. The phrase identified in this step S1107 corresponds to the phrase in the text sentence that served as a basis for related phrase generation.

It should be noted that the search engine 20 may perform the above-described processing for identifying the search grounds for each location where the search query appeared in the directed graph.

The above-described processing allows the search engine 20 to provide the user with related phrases that served as grounds for a hit obtained through a search, even if a resource obtained in response to a search query is not obtained directly based on a phrase in the search query but obtained based on phrases related to the phrase in the search query.

In addition, for example, even if a search is conducted on the index 241 of the present embodiment based on a search query involving an OR search on a plurality of phrases, the user is still enabled to easily discern the phrases, in the plurality of phrases, that contributed to the obtaining of a resource with the aid of the presentation of the search grounds to the user. Further, even if resources are obtained from the search query that are unexpected by the user, the user is enabled to recognize that the search engine 20 is functioning normally with the aid of the representation of the search grounds.

An example of processing for identifying the search grounds by the search engine 20 will be described below. FIGS. 12A to 12D are diagrams for illustrating an example of a process in which search grounds are identified based on a directed graph of a resource searched by a search engine according to an embodiment of the present invention. This example shows the identification of the search grounds by the search engine 20 in the present example based on the directed graph shown in FIG. 9.

Figure 12A:
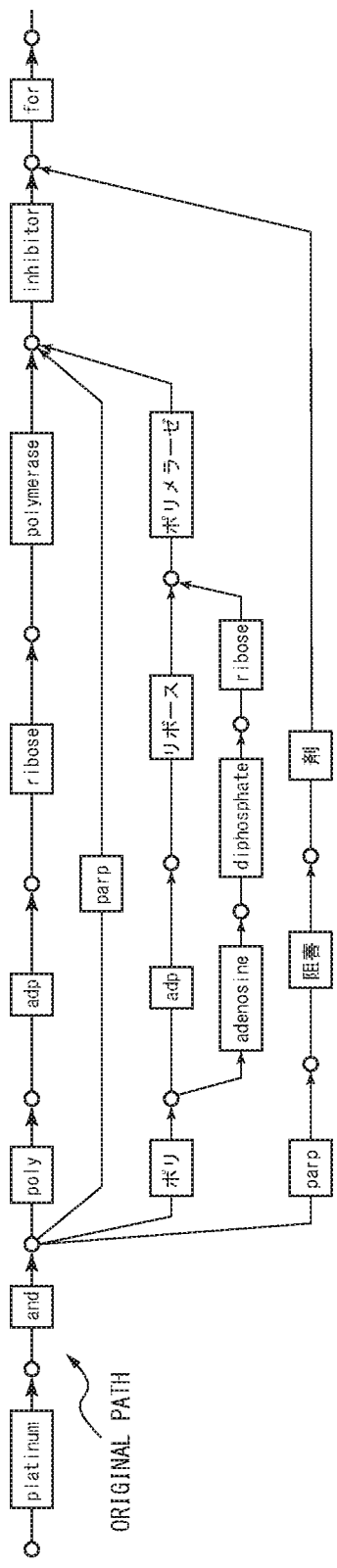
FIGS. 12A to 12D are diagrams for illustrating an example of a process in which search grounds are identified based on a directed graph of a resource searched by a search engine according to an embodiment of the present invention.
Figure 12B:
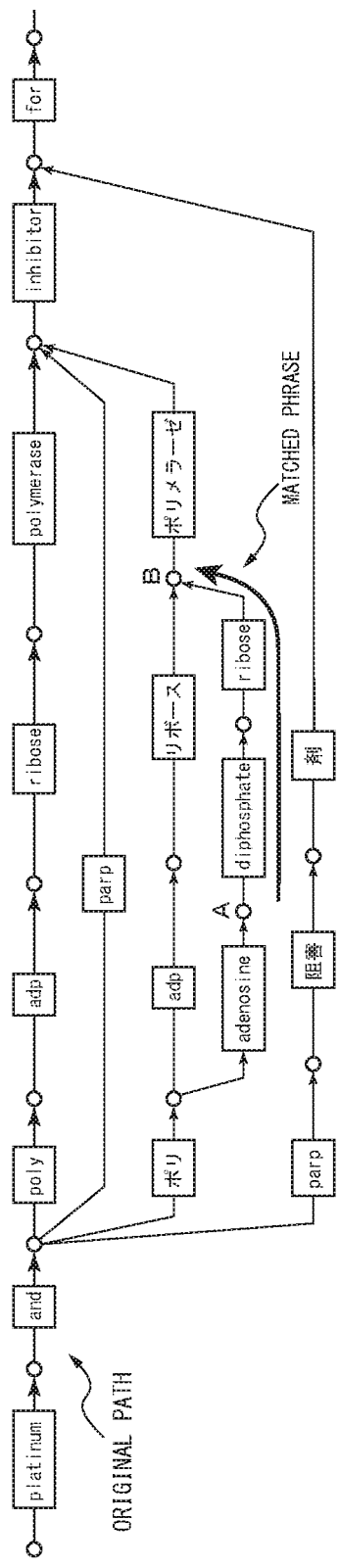

The search engine 20 first identifies a directed graph ID of the obtained resource from the resource information file of the database 24, as described above, to read a directed graph, such as that shown in FIG. 12A, from the database 24 and starts conducting a search on the directed graph based on the phrase "diphosphate ribose" contained in a search query. During such search process, if a phrase that matches the phrase in the search query is found in a path in the directed graph, the search engine 20 locates the location in the directed graph where such phrase appeared (FIG. 12B). Hereinafter, a front-end node of the located location will be referred to as the "front-end node A" and a back-end of the located location will be referred to as the "back-end node B."

Figure 12C:
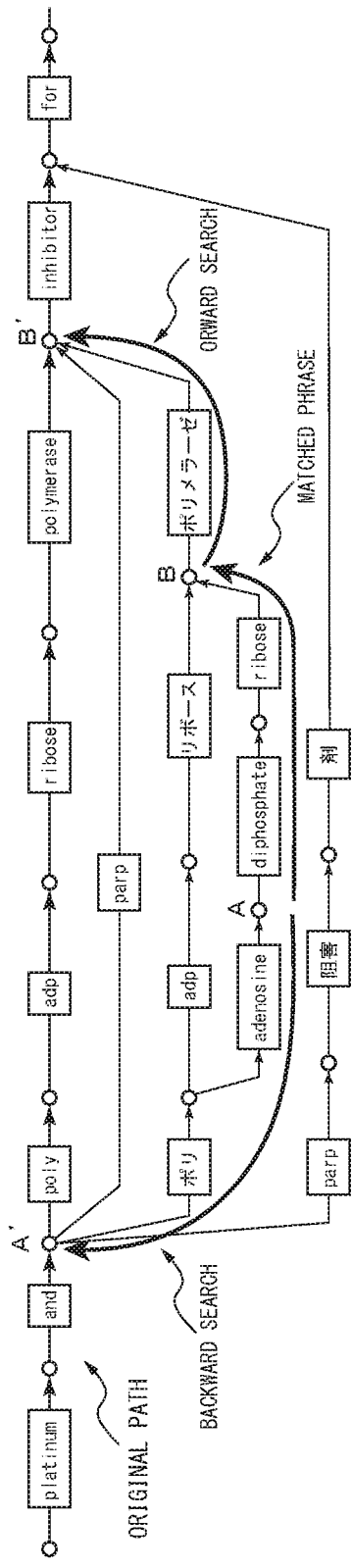

The search engine 20 then traces the path including the located location backward from the front-end node A until a node in the text-sentence-based original path is reached, and the reached node is identified as a branch node A'. The search engine 20 traces the path including the located location forward from the back-end node B until a node in the original path is reached, and the reached node is identified as a merge node B' (FIG. 12C).

Figure 12D:
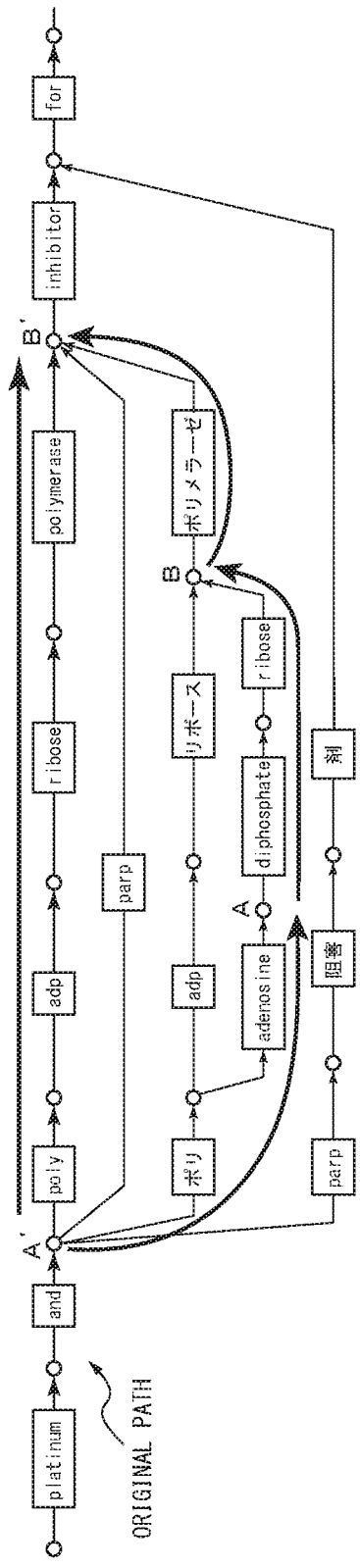

The search engine 20 then traces the path from the branch node A' to the merge node B' via the path including the located location to identify the phrase "PORI|adenosine|di-phosphate|ribose|PORIMERAZE." The phrase in the located location is the phrase related to the search query, i.e., the related phrase that served as the grounds for the obtained resource. The search engine 20 then also traces the original path that is based on the text sentence in the resource from the branch node A' to the merge node B' to identify the phrase "poly|adp|ribose|polymerase" (FIG. 12D). The identified phrase in the original path corresponds to the phrase in the text sentence that served as a basis for related phrase generation.

After the search engine 20 identifies the phrase that served as the search grounds as described above, the search engine 20 transmits the search result including such phrase that served as the search grounds to the client 30. In response to this, the client 30 may display the search result on a web browser.

Figure 13A:
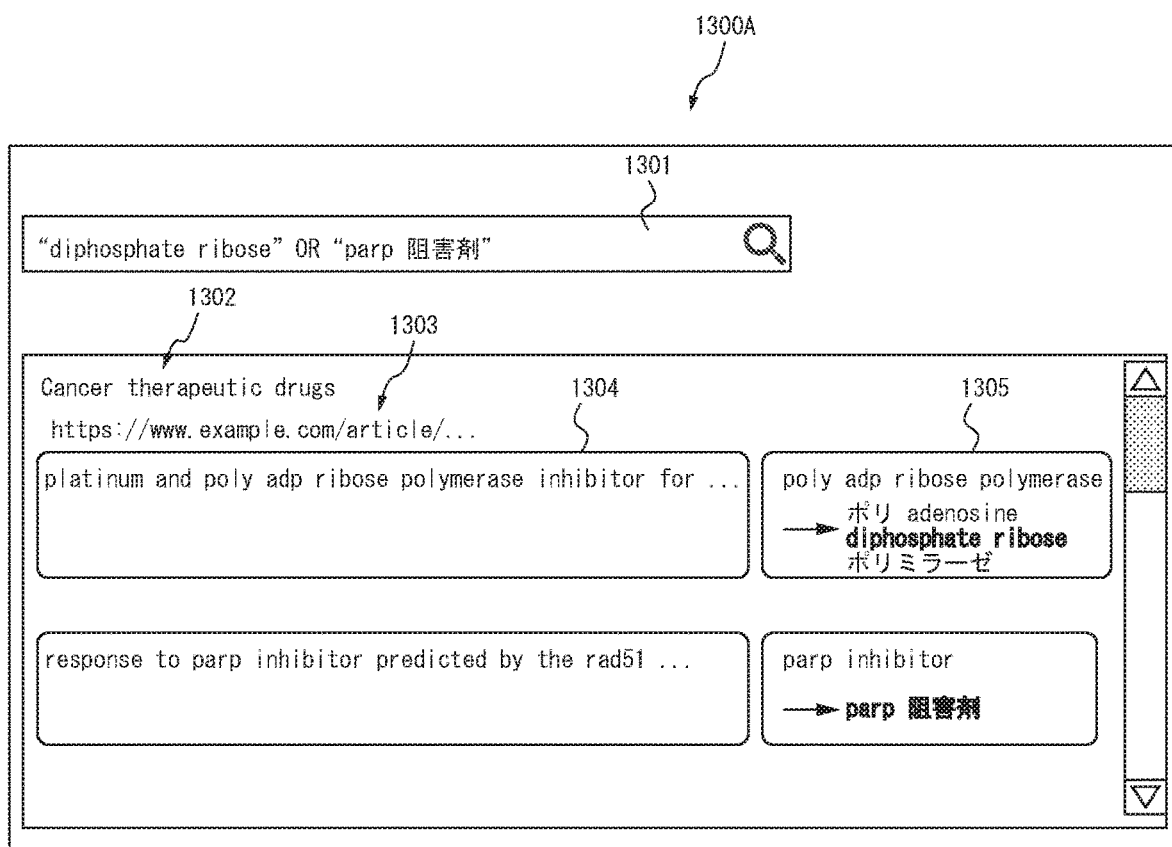
FIGS. 13A to 13C are diagrams showing an example of a search result screen displayed on a client in an information search system according to an embodiment of the present invention.
Figure 13B:
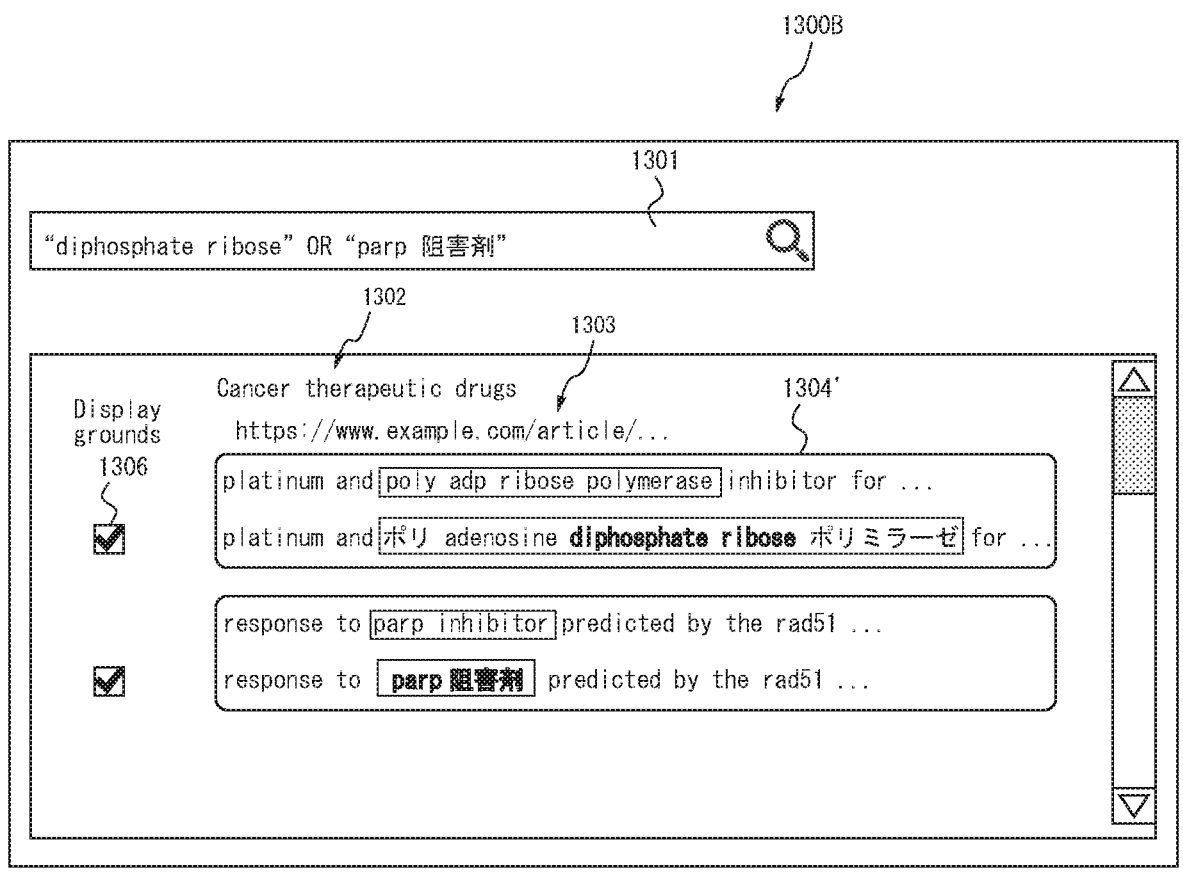
Figure 13C:
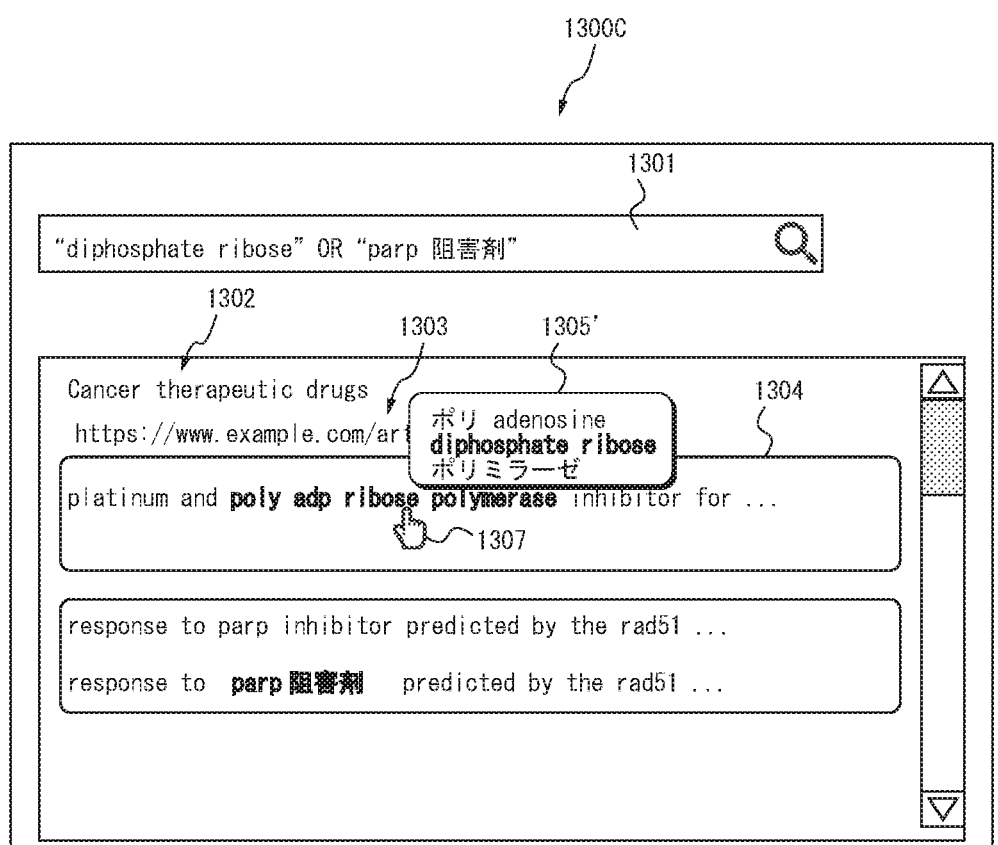

FIGS. 13A to 13C show examples of a search result screen displayed on a client in an information search system according to an embodiment of the present invention.

In the example shown in FIG. 13A, the search result screen 1300A shows, for example, a name 1302 of a resource and a link 1303 to the resource. Such resource is obtained through a search by the search engine 20 based on a search query entered into a search query input field 1301. In the example shown in FIG. 13A, the name "Cancer therapeutic drugs" of the resource that is obtained in response to the search query "'diphosphate ribose' OR 'parp SOGAIZAI'" and the URL of such resource are shown. The search result screen of the present embodiment also includes: a body text display area 1304 and a search ground display area 1305. For example, the body text display area 1304 and the search ground display area 1305 may be arranged side by side. The body text display area 1304 displays at least part of the text sentence in the resource obtained in response to the search query. The displayed text sentence may be, for example, at least part of the text sentence related to the phrase in the search query. The search ground display area 1305 displays the related phrase that served as grounds for the resource to be obtained in response to the search query. The related phrase is highlighted for better visibility for the user by techniques such as color coding, hatching, bold type, italic type or boxed type. The example in FIG. 13A indicates which related phrase the phrase in the resource obtained in response to the phrase in the search query, is associated with. In other words, the example indicates which phrase in the text sentence in the resource is replaced by which related phrase that led to the obtained resource.

FIG. 13B shows the search result screen 1300B in which at least part of the text sentence in the resource that is obtained in response to the search query and the related phrase that served as grounds for the resource to be obtained in response to the search query are displayed in the body text display area 1304'. The related phrase may be highlighted for better visibility for the user. The search result screen 1300B in the present example also includes a checkbox 1306 for allowing the user to arbitrarily select whether or not to display the search grounds. If the checkbox 1306 is checked, the search grounds are displayed in the search result screen 1300B. For example, when the user enters a search query and is presented with the search result, if the user wants to view the search grounds, the checkbox 1306 may be checked in order to display the search grounds. In this manner, after the search result screen 1300B is displayed in an abbreviated form, the user is enabled to selectively display the search grounds of the relevant part.

FIG. 13C shows the search result screen 1300C in which at least part of the text sentence in the resource that is obtained in response to the search query is displayed in the body text display area 1304. When the user operates a pointer cursor 1307 to hover the pointer cursor 1307 over the related phrase, the search ground display area 1305' is displayed in a pop-up manner. The related phrase may be highlighted so that the user can know which phrase the related phrase is associated with.

As described above, the search result screen of the present embodiment displays, in a mutually-associated manner, the text sentence in the resource that is obtained in response to the search query and the related phrase that served as grounds for the resource to be obtained. This configuration enables the user to easily recognize the related phrase that served as the search grounds.

Another example of search/update processing of a directed graph illustrated in FIG. 8 will be described below. In this example, the search is conducted only on edges (tokens) in the directed graph that have not yet been searched. In other words, re-search on the tokens that have already been searched is avoided. For this purpose, a tree structure configured by an ordered node is used in the present example. Such tree structure is known as a trie or a prefix tree. Specifically, in the trie, all nodes subordinate to a node have a shared prefix in their corresponding character string (here, a token). In the present example, individual words that configure a phrase in the dictionary 22 are allocated to edges between nodes in the trie. For ease of understanding, descriptions will be provided hereinafter based on the premise that the phrases, such as those shown in FIG. 14, are registered in part of the dictionary 22.

Figure 15:
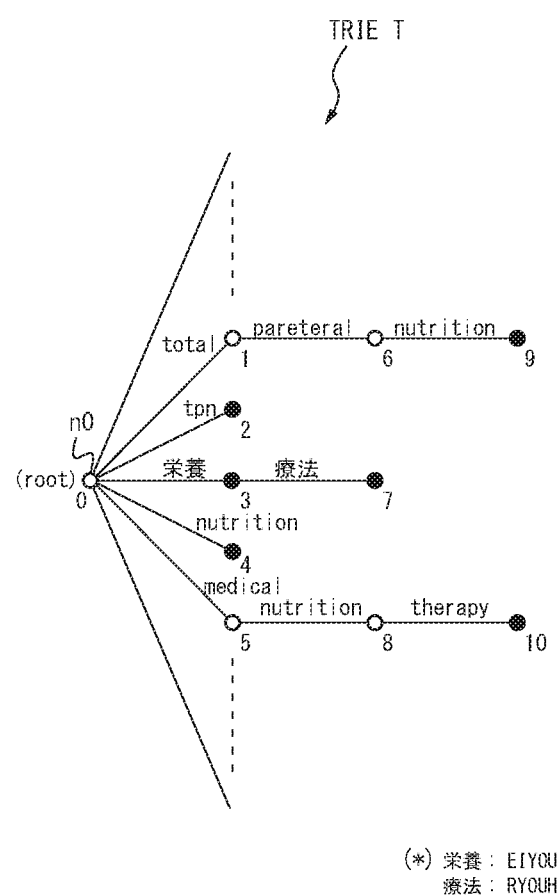
FIG. 15 is a diagram for illustrating an example of a trie in a search engine according to an embodiment of the present invention.

The search engine 20 of the present example comprises a trie created based on the dictionary 22. FIG. 15 is a diagram for illustrating an example of a trie created based on the phrases registered in the dictionary shown in FIG. 14. The trie T is typically a type of data structure or data arrangement that can be interpreted by a processor in a computing device, and is configured, for example, as one or more files or tables, but the configuration is not limited thereto. For example, the trie T may be configured as a static file or table, and the entirety or part thereof may not be memory-resident and may be dynamically configured during execution of processing in accordance with a predetermined algorithm.

As shown in the trie T in FIG. 15, the individual words in the phrase registered in the dictionary 22 are allocated in a sequential order to the edges between the nodes, with the node n0 being set as a root node. Each node is assigned with, for example, a unique number. The root node n0 is assigned with, for example, the number "0." In FIG. 15, each of the rest of the nodes is assigned with a number from 1 to 10 for the sake of convenience. A solid node in FIG. 15 represents a phrase terminal node and functions as a flag for recognizing a phrase registered in the dictionary 22. In other words, a phrase indicated by the path from the root node n0 to the phrase terminal node corresponds to a phrase registered in the dictionary 22. For example, as shown in FIG. 14, both "EIYOU" and "EIYOU|RYOUHOU" are registered in the dictionary 22 and thus, the nodes n3 and n9 in the trie T shown in FIG. 15 are phrase terminal nodes.

Figure 16A:
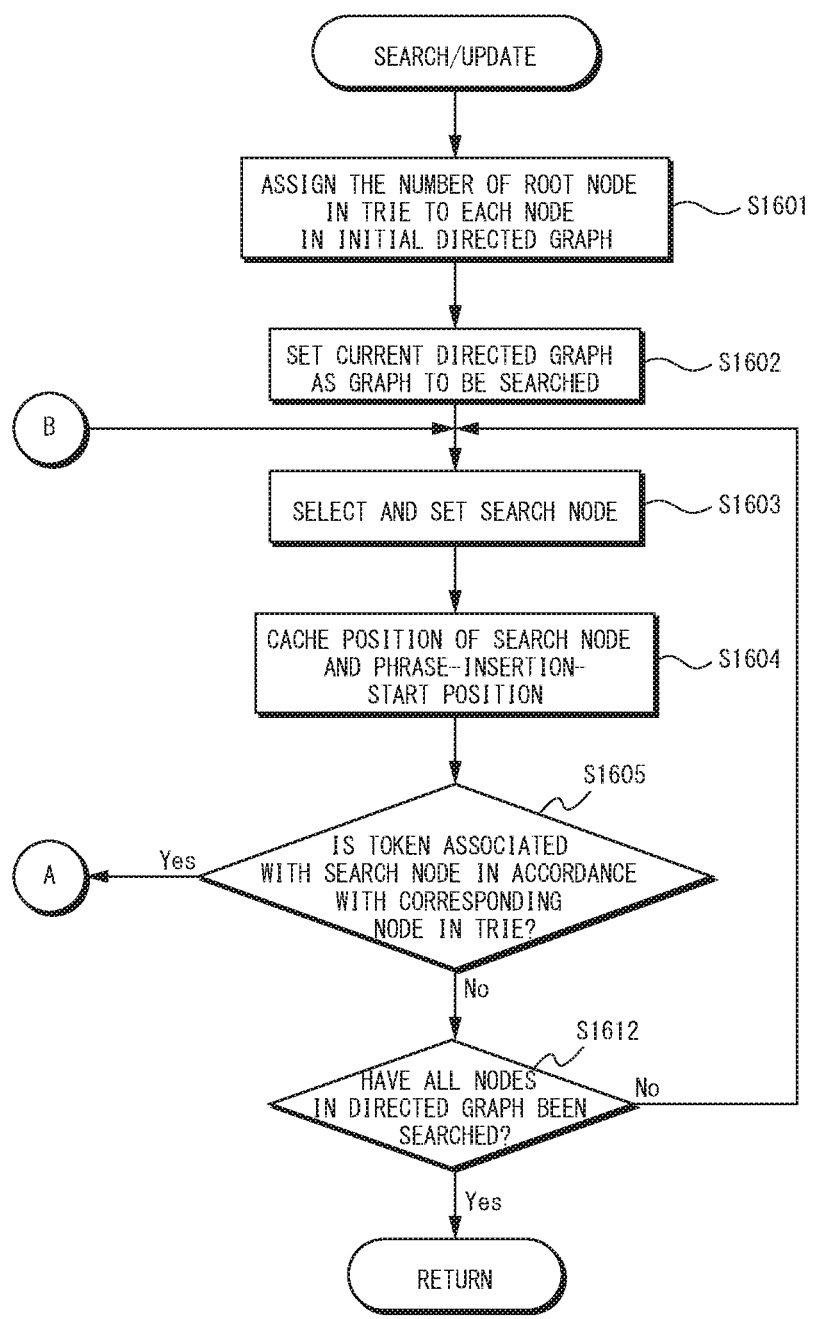
FIGS. 16A and 16B are flowcharts for illustrating another example of search/update processing of a directed graph by a search engine according to an embodiment of the present invention.
Figure 16B:
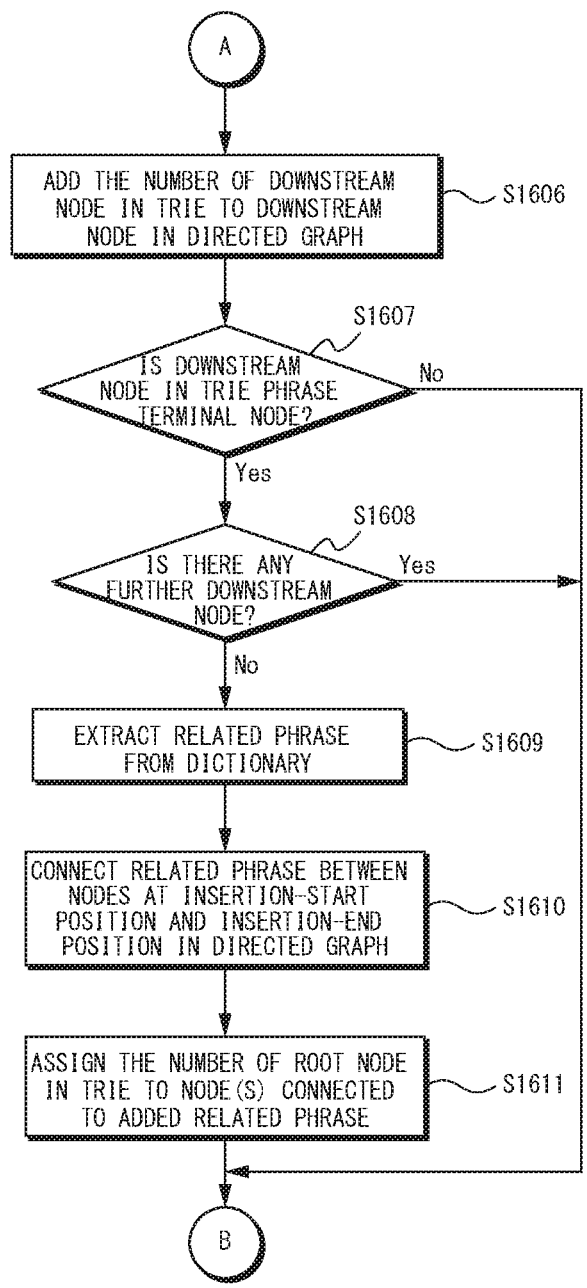

FIGS. 16A and 16B are flowcharts for illustrating another example of index creation processing by a search engine according to an embodiment of the present invention. More specifically, FIGS. 16A and 16B are flowcharts of search/update processing of a directed graph.

As shown in FIG. 16A, the directed graph generation unit 233 may first assign, for example, the number "0" representing a root node n0 (i.e., the root number) of a trie to each node of the initial directed graph (S1601). Alternatively, assignment of the root numbers to the respective nodes in the initial directed graph may be performed when the initial directed graph is generated (see S603 in FIG. 6).

Next, the directed graph search unit 234 sets the initial directed graph as the directed graph to be searched (S1602), and then selects one leading node in the directed graph and sets this leading node as the current search node (S1603). Then, the selected search node is stored as a searched node. At this point in time, the directed graph search unit 234 caches the position of the search node and a start position where a phrase is to be inserted (hereinafter referred to as the "phrase-insertion-start position") in a cache region (not shown) (S1604). Accordingly, the directed graph search unit 234 is enabled to locate the positions of nodes that are not yet searched and the positions where the related phrase should be inserted based on the cached content.

The directed graph search unit 234 then determines whether or not a token (phrase) associated with the search node is to be searched (retrieved) in accordance with the corresponding node in the trie T (S1605). More specifically, the directed graph search unit 234 identifies a token of an edge connected to the search node and determines whether or not the identified token matches a token of an edge connected to the node of the trie T that corresponds to the number assigned to the search node. If the identified token is searched in the trie T (S1605, Yes), the directed graph search unit 234 additionally assigns the number assigned to a node downstream of the token in the trie T to a node downstream of the identified token in the directed graph (S1606 in FIG. 16B).

Figure 17:
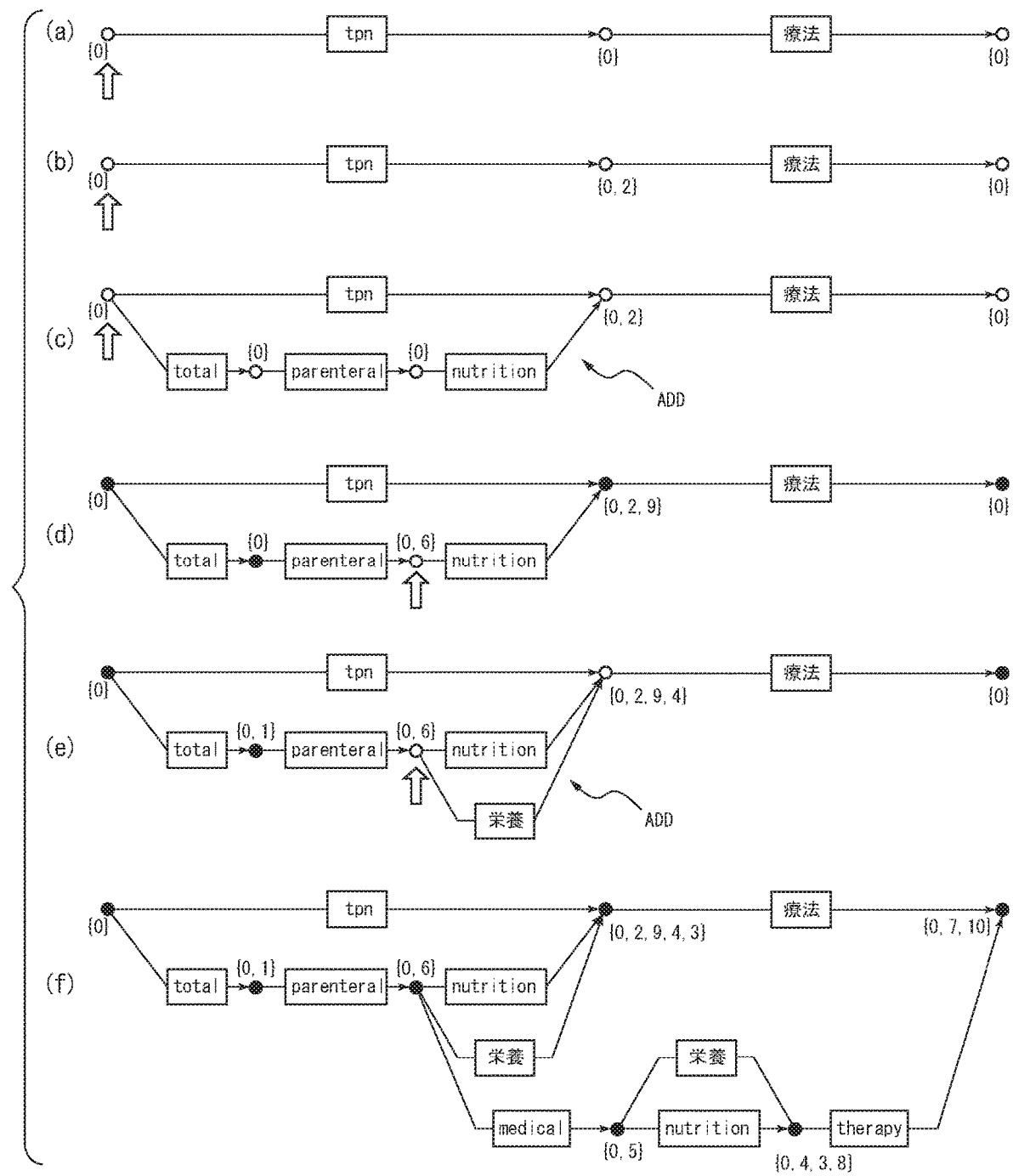
FIG. 17 is a diagram for illustrating another example of a process in which part of a directed graph is expanded by a search engine according to an embodiment of the present invention.

For example, if one considers the token connected to the search node in the directed graph to be "tpn," in this case, the directed graph search unit 234 finds the token "tpn" of the edge connected to the root node n0 in the trie T, and additionally assigns the number "2" of the downstream node connected to such edge to the downstream node connected to the token "tpn" in the directed graph (see FIG. 17(*b*)).

The directed graph search unit 234 then determines whether or not the downstream node of the trie T is a phrase terminal node (S1607). If the downstream node is determined to be a phrase terminal node (S1607, Yes), the directed graph search unit 234 determines whether there is a node further downstream of such downstream node (S1608). If the directed graph search unit 234 determines that there is no further downstream node (S1608, No), the directed graph generation unit 233 extracts a related phrase of the token (phrase) with reference to the dictionary 22 (S1609) and additionally connects the extracted related phrase between the relevant nodes in the directed graph in order to update the directed graph (S1610). In other words, the directed graph generation unit 233 connects the path including the related phrase, in a parallel manner, between a node at the cached phrase-insertion-start position and the node (i.e. the node at the back-end position of the insertion) downstream of the token in the directed graph. After the directed graph has been updated by the directed graph generation unit 233, the directed graph search unit 234 assigns the number "0" of the root node n0 to a node connected to the newly added related phrase in the directed graph (S1611) and returns to the processing in step S1603 (FIG. 16A).

If, on the other hand, the directed graph search unit 234 determines that the downstream node of the trie T is not a phrase terminal node (S1607, No), the directed graph search unit 234 returns to the processing in step S1603 in order to set a next search node. In addition, if the directed graph search unit 234 determines that the downstream node of the trie T has a further downstream node (S1608, Yes), the directed graph search unit 234 also returns to the processing in step S1603 in order to set a next search node.

In step S1605, if the directed graph search unit 234 fails to search the identified token in the trie T (S1605, No), the directed graph search unit 234 determines whether or not all of the nodes in the directed graph have been searched (S1612). If the directed graph search unit 234 determines that not all of the nodes in the directed graph have been searched (S1612, No), the directed graph search unit 234 returns to the processing in step S1603 in order to continue the search in the directed graph. On the other hand, if the directed graph search unit 234 determines that all of the nodes in the directed graph have been searched (S1612, Yes), the directed graph search unit 234 terminates the search processing.

An example of directed graph expansion processing by a search engine 20 using the above-described trie T will now be described. FIG. 17 is a diagram for illustrating another example of a process in which a directed graph is expanded by a search engine according to an embodiment of the present invention. It should be noted that a blank node in FIG. 17 represents a node to be searched (i.e., a not-yet-searched node) and a solid node represents a node that has already been searched.

If one considers that an initial directed graph is generated based on the entered text sentence as described above, FIG. 17(*a*) shows part of such initial directed graph. Each node in the initial directed graph is assigned with the root number "0." In the process of conducting a search on the directed graph, the directed graph search unit 234 sets a node indicated by a blank arrow as a search node. The directed graph search unit 234 also caches the position of the search node and a start position where a phrase is to be inserted in a cache region.

The directed graph search unit 234 then determines whether or not the token "tpn" of an edge connected to the search node matches a token of an edge connected to the node in the trie T that corresponds to the number "0" of such search node. In the present example, one of the edges connected to the root node n0 in the trie T has the token "tpn" and thus the directed graph search unit 234 additionally assigns the number "2," which is assigned to a node downstream of the token in the trie T, to a node downstream of the token in the directed graph (FIG. 17(*b*)).

The directed graph search unit 234 then determines that the downstream node of the token in the trie T is a phrase terminal node. In response, the directed graph generation unit 233 adds, to the directed graph, the phrase "total|par-enteral|nutrition" related to the token (phrase) with reference to the dictionary 22 (FIG. 14) in accordance with the cached phrase-insertion-start position. The directed graph generation unit 233 also assigns the number "0" representing a root node n0 to a newly added node (FIG. 17(*c*)).

Thereafter, the directed graph search unit 234 proceeds with the search processing in an analogous manner. If one considers that the filled-in nodes have already been searched and a node indicated by a blank arrow is set as a search node as shown in FIG. 17(*d*), then, in accordance with the token "nutrition" of the edge from the node n6, the directed graph search unit 234 assigns the node number "9" of a node subordinate to the node n6 to a subordinate node in the directed graph in the search in the trie T. The node n6 is a phrase terminal node. Therefore, the directed graph search unit 234 would normally connect a path including the phrase (token) "tpn" related to the phrase "total|parenteral|nutrition" with reference to the dictionary 22; however, the related phrase "tpn" is already present at the phrase insertion position and thus the directed graph search unit 234 does not connect this path. This configuration suppresses redundant path addition in the directed graph expanding processing.

Subsequently, the directed graph search unit 234 proceeds with the search processing in an analogous manner. The node n4 in the trie T is a phrase terminal node and thus a path including the token "EIYOU" is connected to a phrase insertion position in the directed graph with reference to the dictionary 22 (FIG. 17(*e*)).

As a result of the directed graph search by the directed graph search unit 234 as described above, the directed graph generation unit 233 finally generates the directed graph shown in FIG. 17(*f*).

It should be noted that, regarding the above-described processing, part of the processing performed by the directed graph generation unit 233 may be performed by the directed graph search unit 234 and/or part of the processing performed by the directed graph search unit 234 may be performed by the directed graph generation unit 233.

As described above, according to the present embodiment, an index 241 is created that enables the collected resources to be efficiently searched in the index-type search engine. As such, a user is enabled to access the collected resources by phrases other than the phrases contained in the collected resources that served as the basis for creating the index 241. Consequently, resources including a related-phrase family, such as synonyms, can be searched in an extensive and efficient manner based on a specific phrase in a specialized field such as the medical field.

In addition, even if a search is conducted on the index 241 of the present embodiment based on a search query involving, for example, an OR search, a user is still enabled to easily discern the phrases, in the plurality of phrases, that contributed to the obtained resources with the aid of the representation of the search grounds to the user. Further, even if resources are obtained from the search query that are unexpected by the user, the user is still enabled to recognize that the search engine 20 is functioning normally with the aid of the representation of the search grounds.

The above-described respective embodiments are illustrations for describing the present invention and are not intended to limit the invention only to these embodiments. The present invention may be implemented in various forms as long as they do not depart from the scope of the present invention.

For example, regarding the methods disclosed in the present specification, steps, operations or functions may be implemented in parallel or in a different order, as long as the results are not inconsistent. The described steps, operations and functions are only provided as examples, and some of the steps, operations and functions may be omitted, combined into a single step, operation or function, or other steps, operations and functions may be added within a scope not departing from the scope of the present invention.

Further, various embodiments are disclosed in the present specification; however, a specific feature (technical matter) in an embodiment may be added to a different embodiment, with an appropriate modification, or may be replaced with a specific feature in such different embodiment, and such form is also included in the scope of the present invention.

INDUSTRIAL APPLICABILITY

The present invention can be extensively used in the field of information search techniques.

REFERENCE NUMERALS

1 information search system
10 computer network 20 search engine
21 crawler
22 dictionary
23 indexer
231 input interface unit
232 text processing unit
233 directed graph generation unit
234 directed graph search unit
235 index creation unit
24 database
241 index
25 query server
30 client

The invention claimed is:

1. An apparatus for creating an index for conducting a search on a database based on a resource including a text sentence, comprising:
a dictionary that includes a plurality of phrases associated with each other for each specific concept; and
a processor configured to:
receive an input of the resource;
perform processing for extracting a plurality of words, as tokens, from the text sentence in the received resource;
generate a directed graph representing a connection relationship between the extracted plurality of tokens in accordance with the text sentence;
set at least one token in the directed graph to be a search-target-phrase;
determine whether the search-target-phrase is found in the dictionary and, if the search-target-phrase is found in the dictionary, conduct a search on the directed graph based on the search-target-phrase, locate a location in the directed graph where the search-target-phrase appeared, and update the directed graph by adding a new token to the directed graph, the new token being based on at least one phrase associated with the search-target-phrase found in the dictionary; and
create an index indicating association with the resource based on the plurality of tokens in the directed graph.

2. The apparatus according to claim 1, wherein the processor is further configured to generate the directed graph in which neighboring tokens, in the plurality of tokens, are connected to each other by a node.

3. The apparatus according to claim 2, wherein the processor is further configured to connect the at least one phrase associated with the search-target-phrase with an appearance location corresponding to a location in the directed graph where the search-target-phrase appeared.

4. The apparatus according to claim 1, wherein the processor is further configured to conduct a search on the updated directed graph.

5. The apparatus according to claim 4, wherein the processor is further configured to conduct a search on the updated directed graph so as to avoid a re-search of a token that has already been searched in the updated directed graph.

6. The apparatus according to claim 5,
wherein the directed graph includes a plurality of nodes that connect neighboring tokens to each other in the plurality of tokens, and
wherein the processor is further configured to store a node that is associated with a token that has already been searched as a searched node and conduct a re-search on a token that is connected to a node other than the searched node.

7. The apparatus according to claim 1, further comprising a data arrangement that indicates a tree structure arranged based on the plurality of phrases included in the dictionary, the tree structure having an ordered node corresponding to each of the plurality of phrases,
wherein the processor is further configured to conduct a search on the directed graph with reference to the tree structure.

8. The apparatus according to claim 7, wherein the processor is further configured to determine that the search-target-phrase has appeared in the directed graph, if the search-target-phrase matches at least one phrase corresponding to at least one ordered node in the tree structure.

9. The apparatus according to claim 8, wherein the processor is further configured to update the directed graph by adding a new token to the directed graph, the new token being based on at least one phrase in the dictionary, the at least one phrase being associated with the matched search-target-phrase.

10. The apparatus according to claim 1, wherein the processor is further configured to extract an N-gram based on the plurality of tokens in the updated directed graph and create the index based on the extracted N-gram.

11. The apparatus according to claim 10, wherein the processor is further configured to extract a word-based N-gram as the N-gram.

12. A search apparatus, comprising:
an index created by the apparatus according to claim 1;
a resource information file that is related to the resource associated with the index; and
a query server configured to conduct a search on the index based on a search query, identify at least one resource from the resource information file based on the result of the search, and output a search result indicating the identified at least one resource,
wherein the query server is configured to identify, based on a directed graph being obtained from the identified at least one resource and including a predetermined related phrase that is related to a phrase in the at least one resource, a ground phrase that served as grounds for the at least one resource to be identified and an original phrase, in the at least one resource, that is associated with the ground phrase, and
wherein the search result includes the ground phrase and the original phrase.

13. A method executed by a computing device for creating an index for conducting a search on a database based on a resource including a text sentence, the method comprising, under control of a processor of the computing device:
loading a dictionary including a plurality of phrases associated with each other for each specific concept into a memory accessed by the processor;
receiving an input of the resource via an input interface unit;
performing text-processing for extracting a plurality of words, as tokens, from the text sentence in the received resource;
generating a directed graph representing a connection relationship between the extracted plurality of tokens in accordance with the text sentence in order to expand the directed graph in a memory accessed by the processor;
searching the directed graph with reference to the dictionary based on a search-target-phrase; and
creating an index indicating the association with the resource based on the plurality of tokens in the directed graph in order to register the index in the database,
wherein the searching the directed graph includes:
setting at least one token in the directed graph to be the search-target-phrase;

determining whether the search-target-phrase is found in the dictionary; and if the search-target-phrase is found in the dictionary, locating a location in the directed graph where the search-target-phrase appeared, and wherein the generation of the directed graph includes:

updating the directed graph by adding a new token to the directed graph, the new token being based on at least one phrase associated with the search-target-phrase found in the dictionary.

14. The method according to claim 13, wherein the generating the directed graph includes generating the directed graph in which neighboring tokens, in the plurality of tokens, are connected to each other by a node.

15. The method according to claim 14, wherein the generating the directed graph includes connecting the at least one phrase associated with the search-target-phrase with an appearance location corresponding to a location in the directed graph where the search-target-phrase appeared.

16. The method according to claim 13, wherein the searching the directed graph includes conducting a search on the updated directed graph.

17. The method according to claim 13, wherein the creation of the index includes extracting an N-gram based on a plurality of words in the updated directed graph and creating the index based on the extracted N-gram.

18. The method according to claim 17, wherein the creation of the index includes extracting a word-based N-gram as the N-gram.

19. A recording medium having recorded thereon, in a non-transitory manner, a computer-readable program for causing a computing device to implement a method for creating an index for conducting a search on a database based on a resource including a text sentence, the method comprising:

loading a dictionary including a plurality of phrases associated with each other for each specific concept in a memory accessed by the processor of the apparatus;

receiving an input of the resource via an input interface unit;

performing text-processing for extracting a plurality of words, as tokens, from the text sentence in the received resource;

generating a directed graph representing a connection relationship between the extracted plurality of tokens in accordance with the text sentence;

conducting a search on the directed graph with reference to the dictionary based on a search-target-phrase; and creating an index indicating the association with the resource based on the plurality of tokens in the directed graph, wherein the conducting the search on the directed graph includes:

setting at least one token in the directed graph to be the search-target-phrase;

determining whether the search-target-phrase is found in the dictionary; and if the search-target-phrase is found in the dictionary, locating a location in the directed graph where the search-target-phrase appeared, and wherein the generating the directed graph includes:

updating the directed graph by adding a new token to the directed graph, the new token being based on at least one phrase associated with the search-target-phrase found in the dictionary.

\* \* \* \* \*